US010724281B2

(12) United States Patent
Haab et al.

(10) Patent No.: US 10,724,281 B2
(45) Date of Patent: Jul. 28, 2020

(54) SLIDING DOOR SYSTEM

(71) Applicant: HAWA SLIDING SOLUTIONS AG, Mettmenstetten (CH)

(72) Inventors: Gregor Haab, Allenwinden (CH); Peter Ettmüller, Jonen (CH); Nejib Yezza, Rickenbach b. Schwyz (CH)

(73) Assignee: HAWA SLIDING SOLUTIONS AG, Mettmenstetten (CH)

( * ) Notice: Subject to any disclaimer, the term of this patent is extended or adjusted under 35 U.S.C. 154(b) by 151 days.

(21) Appl. No.: 16/090,355

(22) PCT Filed: Apr. 6, 2017

(86) PCT No.: PCT/EP2017/058248
§ 371 (c)(1),
(2) Date: Oct. 1, 2018

(87) PCT Pub. No.: WO2017/182286
PCT Pub. Date: Oct. 26, 2017

(65) Prior Publication Data

US 2019/0112854 A1 Apr. 18, 2019

(30) Foreign Application Priority Data

Apr. 20, 2016 (EP) .................................... 16166287

(51) Int. Cl.
*B60J 1/16* (2006.01)
*E05D 15/06* (2006.01)
*E06B 3/46* (2006.01)

(52) U.S. Cl.
CPC ........ *E05D 15/0652* (2013.01); *E06B 3/4654* (2013.01); *E05Y 2201/48* (2013.01);
(Continued)

(58) Field of Classification Search
CPC . E05D 15/0652; E05D 15/063; E06B 3/4654; E06B 3/4636; E06B 3/4645;
(Continued)

(56) References Cited

U.S. PATENT DOCUMENTS 1,945,332 A 1/1934 Robinson
3,469,892 A * 9/1969 Langstroth ............ F16C 13/006 384/18
6,336,247 B1 * 1/2002 Schnoor .............. E05D 15/0634 16/105
6,647,590 B2 11/2003 Haab et al.
(Continued)

FOREIGN PATENT DOCUMENTS

DE 10012511 A1 10/2000
DE 202004012852 U1 10/2004
DE 202015105569 U1 12/2015

OTHER PUBLICATIONS

Jun. 27, 2017 International Search Report issued in International Patent Application No. PCT/EP2017/058248.

*Primary Examiner* — Chi Q Nguyen
(74) *Attorney, Agent, or Firm* — Oliff PLC

(57) ABSTRACT

A sliding door system includes a rail device with a mounting rail mountable in a building, with a guide rail in which at least two carriages that are connected to a sliding door are held displaceable along a guide axis, and with a plurality of coupling devices with which the guide rail and the mounting rail are releasably connected with one another and which comprise a coupling head connected to the guide rail or the mounting rail, that comprises a coupling plate and a coupling neck and that can be anchored in a coupling opening provided in the mounting rail or the guide rail and which comprises a first opening part with a diameter larger than a diameter of the coupling plate, and a second opening part adjacent thereto with a diameter larger than the diameter of the coupling neck but smaller than the diameter of the coupling plate.

15 Claims, 14 Drawing Sheets

(52) U.S. Cl.
CPC ... *E05Y 2600/524* (2013.01); *E05Y 2600/528* (2013.01); *E05Y 2600/628* (2013.01); *E05Y 2600/63* (2013.01); *E05Y 2800/35* (2013.01); *E05Y 2800/422* (2013.01); *E05Y 2900/14* (2013.01)

(58) Field of Classification Search
CPC ........... E05Y 2900/132; E05Y 2600/60; E05Y 2600/10; E05Y 2600/634; E05Y 2600/528; E05Y 2600/625; E05Y 2600/524; E05Y 2600/63; E05Y 2800/422; E05Y 2800/35; E05Y 2900/14; E05Y 2201/48; Y10T 29/4984; Y10T 16/379; Y10T 16/381
USPC ...... 49/372, 410, 425, 506, 404, 504; 16/90, 16/94 R, 95 R, 96 R, 97, 106, 107; 29/434
See application file for complete search history.

(56) References Cited

U.S. PATENT DOCUMENTS

| | | | | |
|---|---|---|---|---|
| 7,743,557 | B2 * | 6/2010 | Liao .................... | E05D 15/0652 16/95 R |
| 7,891,052 | B2 * | 2/2011 | Haab ................... | E05D 15/0634 16/98 |
| 7,900,318 | B2 * | 3/2011 | Hanley .................... | A47K 3/34 16/87.4 R |
| 8,579,006 | B2 * | 11/2013 | Levin ...................... | E04B 2/827 160/184 |
| 9,341,011 | B2 * | 5/2016 | Haab ................... | E05D 15/0634 |
| 10,125,528 | B2 * | 11/2018 | Wypych ................ | E06B 3/4636 |
| 2005/0000164 | A1 * | 1/2005 | Jacobs ................ | E05D 15/0691 49/425 |
| 2005/0235571 | A1 * | 10/2005 | Ewing ....................... | E06B 1/70 49/410 |
| 2016/0251885 | A1 * | 9/2016 | Conley ................... | E05D 15/58 49/127 |
| 2017/0298669 | A1 * | 10/2017 | Boring ................ | E05D 15/0626 |

* cited by examiner

SLIDING DOOR SYSTEM

The invention relates to a sliding door system with a sliding door that optionally may be moved into a parking space.

BACKGROUND

Sliding door systems comprise at least one sliding door that is suspended on at least two carriages that are guided in a guide rail. The guide rails are firmly mounted by means of mounting screws at a ceiling or a wall or are releasably mounted by means of a fixing device at a mounting profile, which is firmly mounted on a ceiling or a wall.

U.S. Pat. No. 6,647,590B2 discloses a rail device with a mounting profile that comprises two legs for receiving a guide rail. The first leg comprises of the mounting profile comprises openings for passing through fixing screws which the mounting profile can be connected to the wall. The second leg is provided with a T-profile-shaped longitudinal slot which is open towards the rail and which serves for receiving and holding locking elements that are connected to mounting screws, with which the guide rail is mounted.

The mounting profile and the guide rail corresponding thereto can already during manufacturing be provided with bores for the mounting screws. The mounting profile is mounted in advance whereafter mounting of the guide rail can be done with little effort. Applying bores and/or cutting threads for mounting the guide rail is not required, so that the same time contamination or a mechanical impairment of the guide rail is avoided. Thereby an optimal function of the guide rail and the carriages guided there in is ensured.

Connection of the guide rail to the pre-mounted mounting profile can easily be done. The locking elements are inserted into the longitudinal slot of the mounting profile, turned from a first position to a second position and subsequently forced and by turning the mounting screws into the same direction. As well the guide rail can easily be released and mounted again, if access is given to the locking elements.

However, sliding door devices often comprise guide rails, which are extending into a parking space, which is delimited by room walls that are mounted after the installation of the guide rail and between which a part of the guide rail and the sliding door, which has been driven into the parking space, is enclosed. If a repair of the guide rail or components installed therein, such as buffer devices or pulling devices and/or damping devices, is required, then that these devices are barely accessible and not is mountable without removing or destroying the room walls.

U.S. Pat. No. 1,945,332A discloses a further device for mounting a guide rail. This device comprises a rail holder that embraces the guide rail and that comprises a larger cross-section with a free space, in which a symmetrically formed clamp is provided, which comprises two wings. In the centre the clamp is held by a screw. When tightening this screw, the wings are pressed downwards against the guide rail, which is thus fixed by the clamp. Hence, this device requires in a first step to enter the guide rail into the cross-section of the rail holder and in a second step tightening of the screw arranged above the guide rail, which is undesirable since screws are scarcely accessible above the guide rail.

DE10012511A1 discloses a sliding door system with a rail device, which comprises a mounting rail installed in a building, a guide rail in which carriages connected to a sliding door are displaceably held as well as a plurality of coupling devices, which serve for connecting the guide rail to the mounting rail. The coupling devices comprise each a mushroom-shaped coupling head that is connected to the guide rail and that can be anchored in a coupling opening, which is provided in the mounting rail and which has the form of a keyhole with a larger and a smaller opening part. For connecting the guide rail to the mounting rail the coupling heads are inserted into the larger opening part of the coupling opening and are moved against the smaller opening part of the coupling opening, in order to lock the coupling heads. For performing adjustments, repairs or maintenance the guide rail is often dismounted. Thereby, the guide rail is shifted back until the coupling heads are again coaxially aligned with the larger opening part of the coupling opening. The guide rail is often shifted forcefully so that the coaxial alignment of the coupling heads with the larger opening part of the coupling opening often succeeds only after several trials in which the guide rail engages in the mounting rail. It must be noted that the installer performs its work usually on a ladder and cannot overview the alignment of the coupling heads relative to the coupling openings. Hence the described working process requires considerable effort.

A further device of this kind, with which the same effort is required when mounting and dismounting the guide rail, is described in DE202015105569U1.

SUMMARY

The present invention is therefore based on the object of providing an improved sliding door system, which does not suffer from the disadvantages described above.

In particular, a sliding door system shall be created, which allows the guide rail to be mounted or dismounted on a mounting rail.

Vibrations and noise which frequently occur with known sliding door systems shall be avoided.

The rail device shall advantageously usable with sliding door systems that comprise a parking space, into which the sliding door can be displaced. It shall be possible, to quickly perform maintenance, repair or the replacement of the guide rail, without removing parts of the parking space.

An exchange of the guide rail shall be executable without automatic guiding, so that the installer does not need to pay attention to the exact alignment and mutual displacement of the guide rail and the mounting rail thus excluding incorrect manipulation.

This object is reached with a sliding door system that comprises the features defined in claims 1. Preferred embodiments of the invention are defined in further claims.

The sliding door system comprises a rail device with a mounting rail mounted or mountable in a building, with a guide rail in which at least two carriages that are connected to a sliding door are guided or guidable along a guide axis, and with a plurality of coupling devices, with which the guide rail and the mounting rail are releasably connected with one another and which comprise each a coupling head that is connected to the guide rail or to the mounting rail, that comprises a coupling plate and a coupling neck and that can be anchored in a coupling opening, which is provided in the mounting rail or the guide rail and which comprises a first opening part with a diameter that is larger than a diameter of the coupling plate, and a second opening part adjacent thereto with a diameter larger than the diameter of the coupling neck but smaller than the diameter of the coupling plate.

According to the invention on one side or on both sides of the coupling head a ramp is provided, which, in a direction towards the coupling neck, increases in height towards the coupling plate. The ramp, which preferably is aligned at least approximately in parallel to the guide axis and, after installation, is facing the first opening part of the coupling opening, allows releasing the guide rail from the mounting rail in a simple manner. When the installed guide rail is forcefully moved relative to the mounting rail, in order to align the coupling head and the first opening part of the coupling opening above one another, the ramp prevents the coupling plate from transferring the edge of the first opening part of the coupling opening and to engage on the other side below the central member of the mounting rail. Instead, the ramp hits the edge of the first opening part and, by gliding across the edge of the first opening part, transfers the coupling plate through the first opening part of the coupling opening. The process runs analogously, if the coupling heads are mounted on the mounting rail and the coupling openings are provided on the guide rail.

When shifting the guide rail, it is therefore ensured that the coupling heads get smoothly released from the guide rail or mounting rail without hooking in at another position. By at least one of the ramps the decoupling process is actively supported.

The ramp can be an integral part of the coupling head or can be part of a device member, which can be coupled to the coupling head in a force-locking and/or form-locking manner.

The ramp can be made from the same or other material is used for the coupling head. The ramp can be made from metal or plastic or a combination thereof. A ramp made of plastic may be equipped at the front side facing the edge of the first opening part with an insert made of metal. With this combination the ramp exhibits due to the elastic member a desirable elasticity when the ramp hits the edge of the first opening part and due to the metal insert a desirable rigidity when the ramp moves across the edge of the first opening part. In preferred embodiments the ramp therefore consists of an elastic member and a metal member preferably a metal insert held by the plastic member.

The ramp has a face side that is facing the edge of the first opening part (when installed) and that is straight or curved. The broadness of the ramp is preferably smaller than the diameter of the coupling neck so that it does not form an obstacle when the coupling neck is moved into the second opening part of the coupling opening. The height of the ramp preferably corresponds to the height of the coupling neck so that the ramp preferably ends below or adjacent to the lower side of the coupling plate.

The ramp preferably exhibits the form of a plate with an inclined front face or deform of a segment of a cone.

The two opening parts of the coupling opening are preferably rounded, so that the coupling plate of the coupling head can be guided practically unobstructed through the first opening part and still only a minimum weakening of the related central member occurs.

Hence, the coupling plate of the coupling head can be guided through the first opening part of the coupling opening, whereafter the guide rail and the mounting rail are mutually shifted in parallel to the guide axis such, that the coupling neck is introduced into the second opening part and is anchored there. The region of the guide rail, which borders the second opening part, serves therefore as flange that holds the coupling plate, which has been guided through the coupling opening, so that the coupling plate can no longer escape back through the coupling opening and the connection between the guide rail and the mounting rail is established. Finally, the guide rail and the mounting rail or preferably mutually locked, e.g. by guiding a bolt or a screw through the guide rail and the mounting rail.

Hence, after the installation of the mounting rail, the guide rail can be lifted towards the mounting rail and shifted and so be coupled with the mounting rail and preferably locked. In the same, the installed guide rail can be unlocked after the installation, grasped outside the parking space, if present, shifted backwards and be released from the mounting rail.

Thereby, the installation of the mounting rail is done in a known the way, whereby it is taken care that the mounting rail it horizontally aligned in the selected height.

In a preferred embodiment the guide rail and the mounting rail comprise each a central member, which is either connected to the coupling head of the coupling devices or is provided with the coupling opening. The parts of the coupling devices or therefore exchangeable and can be mounted on the guide rail or the mounting rail as desired.

The central member of the guide rail is preferably provided on both sides each with a side member and with at least one coupling flange distant and aligned in parallel thereto, optionally a flange plate. The first side member or the first side members form together with a rail foot, on which the wheels of the carriage can be seated, each an L-profile.

The central member of the mounting rail is preferably also provided on both sides each with a side member, which is dimensioned and aligned such that, then mounting the rail device, the side member can enter a coupling space provided between the at least one coupling flange and the side member of the guide rail neighbouring thereto. Hence, during the process of mounting the guide rail, the guide rail and the mounting rail can provisionally be coupled with one another before the coupling heads are introduced into the coupling openings and are anchored. This process is facilitated by the provisional coupling.

The at least one coupling flange therefore allows the guide rail to be provisionally coupled with the mounting rail in a simple manner and to be aligned in parallel thereto. The coupling heads and coupling openings are aligned along the guide axis and can therefore be shifted along the guide axis until they can be engaged and anchored into one another.

In addition or alternatively the diameter of the guide rail is selected smaller than the diameter of the mounting rail, so that the guide rail can be inserted into the mounting rail and can axially be shifted. Hence, this process for coupling and decoupling the guide rail is done under guidance and can easily be performed by the installer.

The coupling head can be connected to the guide rail or to the mounting rail in any suitable manner. Preferably the coupling head or its coupling neck is screwed, moulded or caulked. E.g., the coupling neck is guided through a related opening in the guide rail or the mounting rail so far that an edge extends beyond the opening, which is connected by a press fit stem process and is plastically deformed to a flange element, in order to establish a force-locking and form-locking connection. The coupling neck preferably comprises a flange element, preferably a flange ring, which abuts the other side of the central member of the guide rail or the mounting rail, which is therefore clamped between the formed flange element and the flange ring. The coupling head can also be mounted with a screw, which is for example axially held in an inner thread of the coupling neck and which abuts with the screw head the central member of the guide rail or the mounting rail. Alternatively, the coupling neck itself can be provided with a thread, which is turned into an opening in the guide rail or the mounting rail, in which a thread or a threaded element is inserted.

The coupling head can rotation symmetrically be constructed and can be mounted in a simple manner. Alternatively, at the related side a segment of the coupling head or the coupling plate, respectively, can be cut away, so that the coupling plate cannot engage in the mounting rail when dismounting. By a suitable design of the coupling head an additional ramp may not be required.

In a further preferred embodiment a buffer device is provided that comprises the at least one ramp and/or at least one resilient element, with which, after connecting the guide rail to the mounting rail, the coupling head is elastically coupled to the central member of the guide rail or the central member of the mounting rail. Thereby any play between the mounting rail and the guide rail is avoided. By the buffer device, which is preferably made from plastic, a direct contact between the guide rail and the mounting rail and therefore metallic noise is avoided, when the sliding door is operated.

The buffer device preferably comprises a plate-shaped member with an opening, which serves for receiving the coupling neck of a coupling head. Thereby, the buffer device can be connected to the coupling head such that the resilient elements or spring elements are arranged laterally adjacent to the coupling head and/or the ramps are arranged aligned along the guide axis on the front side and the backside of the coupling head.

The at least one resilient element and/or the at least one ramp or preferably connected in one piece to the buffer device. Alternatively, the resilient element and/or the ramp can be connected e.g. by means of a snap-on or click connection in a form-locking manner to the buffer device.

The at least one resilient element and/or the at least one ramp are preferably aligned in parallel to the guide axis, so that they exhibit optimal performance during mutual displacement of the guide rail and the mounting rail and are exposed to pressure only, but not torsion.

In a further preferred embodiment the coupling head comprises a central bore, through which a fixing element, such as a screw, can be guided, e.g. in order to fix the guide rail or the mounting rail, electrical devices, such as power supply lines for motorised carriages, etc.

The coupling head is preferably held torque proof in the related central member, so that it cannot automatically get loose from the central member. In a particularly simple manner this can be done by providing the coupling neck and the thereto corresponding opening in the central member of the guide rail or the mounting rail with a polygonal cross-section. Alternatively a locking device can be used. E.g., the buffer device is connected torque proof with the related central member and torque proof with the coupling head and is provided for this purpose with locking elements, which are connectable in a form-locking manner to the guide rail and to the coupling head. The connection between the buffer device and the coupling head is advantageously established with the inventive ramp, which engages in a form-locking manner into a recess provided in the coupling head, and with holding elements, which are connectable in a form locking manner to the guide rail or to the mounting rail.

The coupling head and/or the buffer device are preferably made of metal or plastic, preferably rigid plastic. Preferably a thermoplastic plastic, such as Polyoxymethylen (POM), is used, which exhibits high strength, stiffness and good sliding properties.

The buffer device can consist of an elastomer or natural rubber, which is preferably provided with a coating, which provides the surface of the buffer device with excellent sliding properties and which facilitates mounting of the rails.

Alternatively, between the coupling head and the buffer device optionally a sound absorbing element can optionally be introduced, which consists of an elastomer or natural rubber and provides improved sound decoupling between the mounting profile and the guide rail. The for example annular sound absorbing element can be several times softer than the material of the buffer device.

In a further preferred embodiment the coupling opening adjoins a coupling channel, which is delimited by the central member of the guide rail and coupling strips, which are distant from the central member and which are held within the guide rail in parallel to the central member facing one another and which are connected each to a side member of the guide rail. Hence, the coupling plate can be inserted through the coupling opening into the coupling channel and can there be held preferably by the resilient elements without play.

BRIEF DESCRIPTION OF THE DRAWINGS

Below the invention is described in detail with reference to the drawings. Thereby show.

DETAILED DESCRIPTION

Figure 1A:
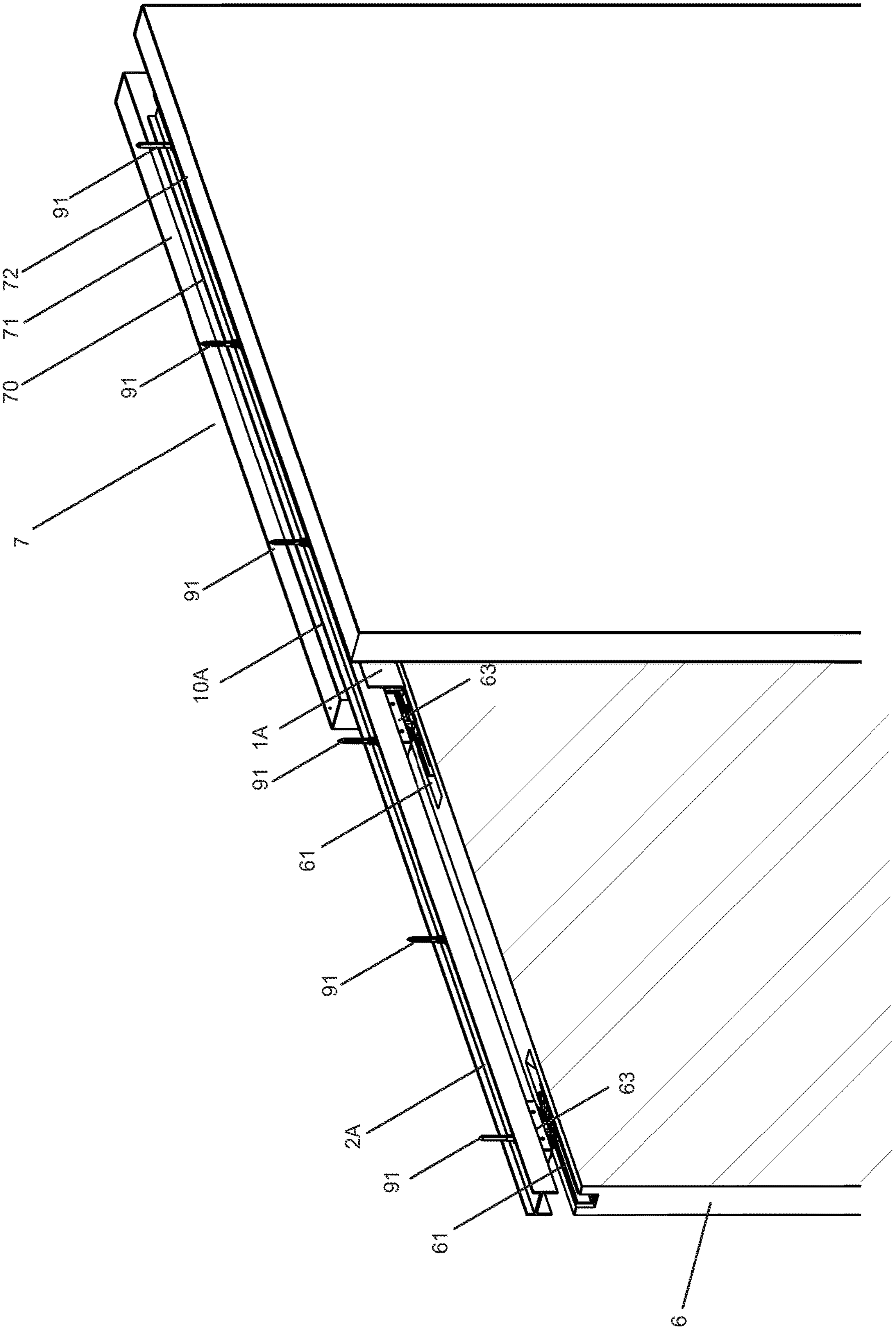
FIG. 1*a* an inventive sliding door system with a parking space 7, which is delimited by room walls 71, 72 and into which an inventive rail device 10A is extending, which comprises a guide rail 1A (front part cut away), in which two carriages 63, that are connected to a sliding door 6, are displaceably seated, and a mounting rail 2A, which by coupling devices are coupled with one another.

FIG. 1*a* shows an inventive sliding door system with a parking space 7, into which an inventive rail device 10A is extending, which comprises a mounting rail 2A and a guide rail 1A releasably connected thereto. The front part of the guide rail 1A outside a parking space 7 is cut away, so that the carriages 63 are visible, which are guided in the guide rail 1A and which are connected via door fittings 61 to a sliding door 6. The parking space 7 is delimited on both sides by room walls 71, 72 that have been firmly installed after installation of the mounting rail 2A and that are removable only with considerable effort. Manual intervention into the room opening 70 of the parking space 7 after the installation of the room walls 71, 72 is no longer possible.

The mounting rail 2A had been installed at the room ceiling in predetermined height and in horizontal alignment by means of mounting screws 91.

Subsequently the carriages 63 and optionally a stopper device (not shown) have been inserted in the guide rail 1A, which then has been connected by inventive coupling devices to the mounting rail 2A. Finally, the sliding door 6, e.g. a glass door or a wooden door, has been connected by means of door fittings 61 to the carriages 63 provided in the guide rail 1A.

Figure 1B:
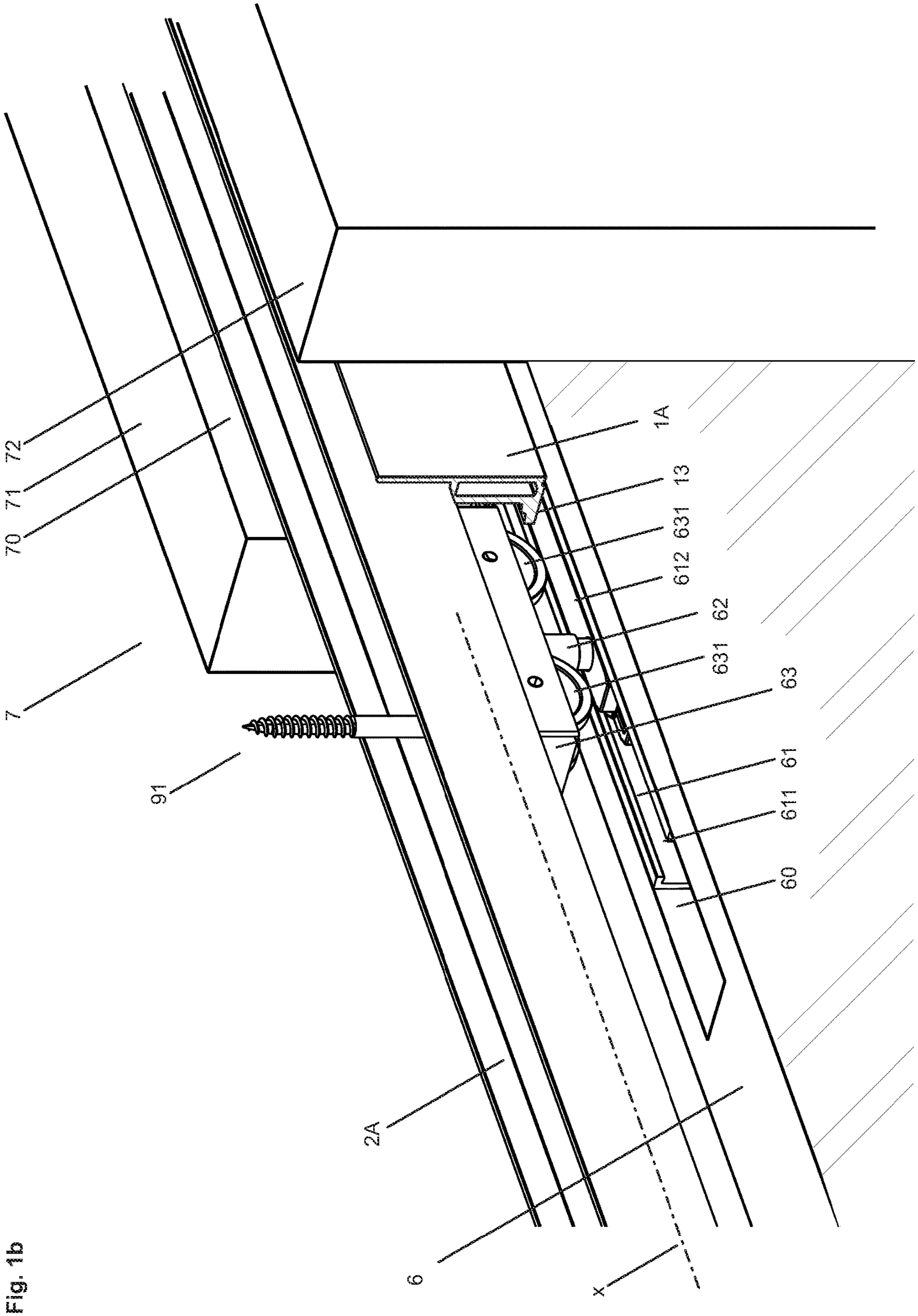
FIG. 1*b* a part of the sliding door system of FIG. 1*a;*

FIG. 1*b* shows as an example that the sliding door 6 has been manufactured from wood and has been provided with recesses 60 at the upper corners. Into the recesses 60 a door fitting 61 has been inserted that comprises a fitting rail 611 and fitting block 612 shifted therein. The fitting block 612 is connected via a threaded bar 62 to the related carriage 63, that comprises wheels 631, which can run each on rail foots 13 provided on both sides of the guide rail 1A. Hence, the carriages 63 and the sliding door 6 are displaceable along a guide axis x and can be driven into the parking space 7. As mentioned, the guide rail 1A has partially been cut away, in order to show the carriage 63 and the door fitting 61.

Figure 1C:
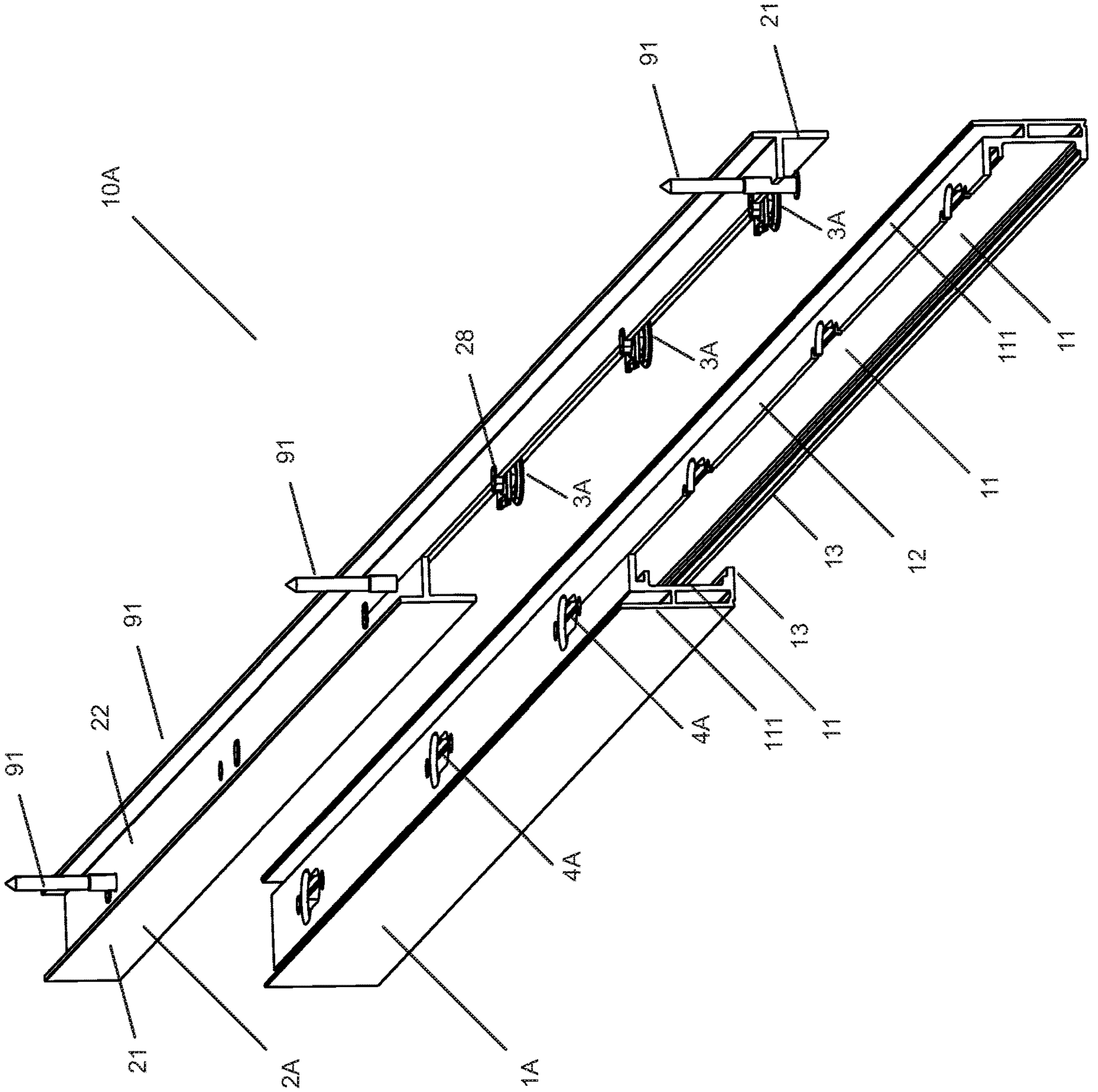
FIG. 1*c* the rail device 10A of FIG. 1*a*, of which a proximal quarter has been cut away, with coupling devices that comprise coupling heads 3A that are connected to the mounting rail 2A and that can be anchored in coupling openings 4A provided in the guide rail 1A.

FIG. 1*c* shows the rail device 10A that has been removed from the sliding door system of FIG. 1*a* and of which the proximal quarter has been cut away in order to completely show the coupling devices, which comprise coupling heads 3A connected to the mounting rail 2A and coupling openings 4A provided in the guide rail 1A. The coupling heads 3A, which can be anchored in the coupling openings 4A, will be described in detail below.

The guide rail 1A comprises a U-profile that is opened downwards and at comprises a central member 12, which is adjoined on both sides by side members 11, which form together with foot members 13 that are facing one another an L-profile each. The side members 11 are further connected via fillets to a flange plate 111 that is aligned in parallel to the side members 11.

The mounting rail 2A comprises an H-profile with a central member 22 that is adjoined on both sides by side members 21. The distance between the side members 21 of the mounting rail 2A is larger than the distance between the side members 11 of the guide rail 1A, but smaller than the distance between the flange plates 111 of the guide rail 1A.

Figure 2A:
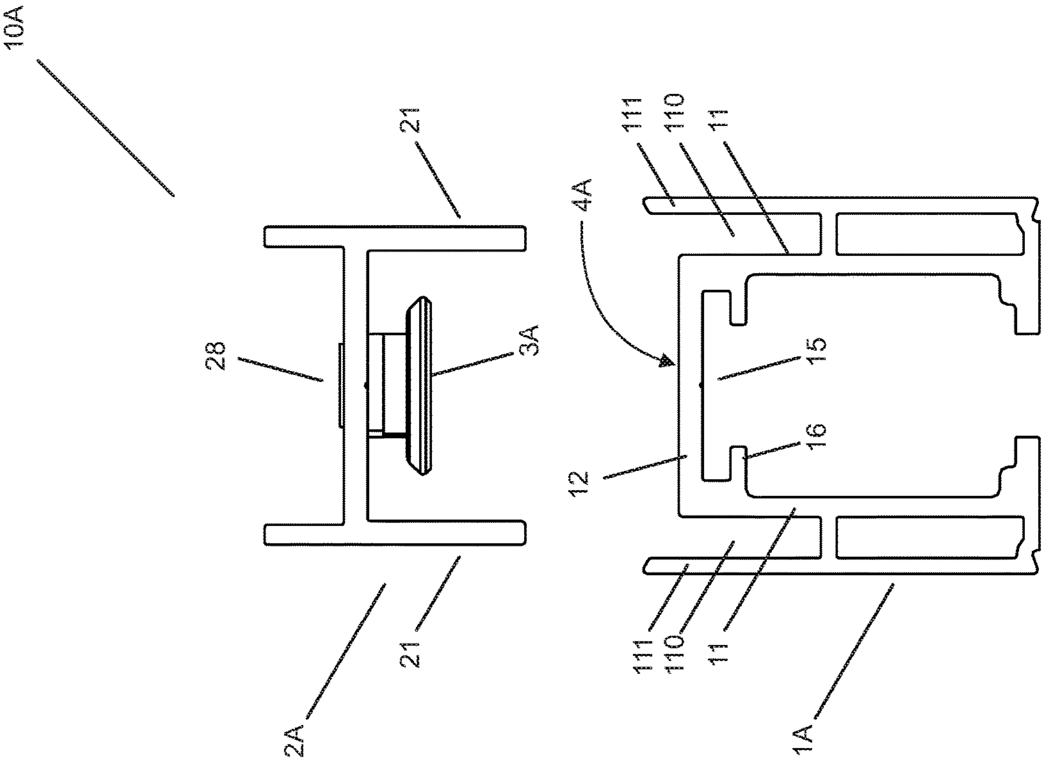
FIG. 2*a* in a front view, the rail device 10A of FIG. 1*c* with the guide rail 1A that has been separated from the mounting rail 2A.

As shown in FIG. 2*a*, between each flange plate 111 and the related side member 11 a coupling space 110 is provided, in which the related side member 21 of the mounting rail 2A can enter. The flange plates 111 overtop the central member 12 of the guide rail 1A at the upper side and therefore facilitate coupling to the installed mounting rail 2A.

Below the central member 12 of the guide rail 1A the coupling openings 4A are adjoined by a coupling channel 15 that is partly delimited by the central member 12 of the guide rail 1A and by two coupling strips 16, which are facing one another on even height and are connected each with one of the side members 11. A space is kept open between the coupling strips 16 that allows a tool to enter the coupling channel 15.

The coupling head 3A is held preferably torque proof in an opening 28, e.g. screwed, press fitted, welded or moulded.

Figure 2B:
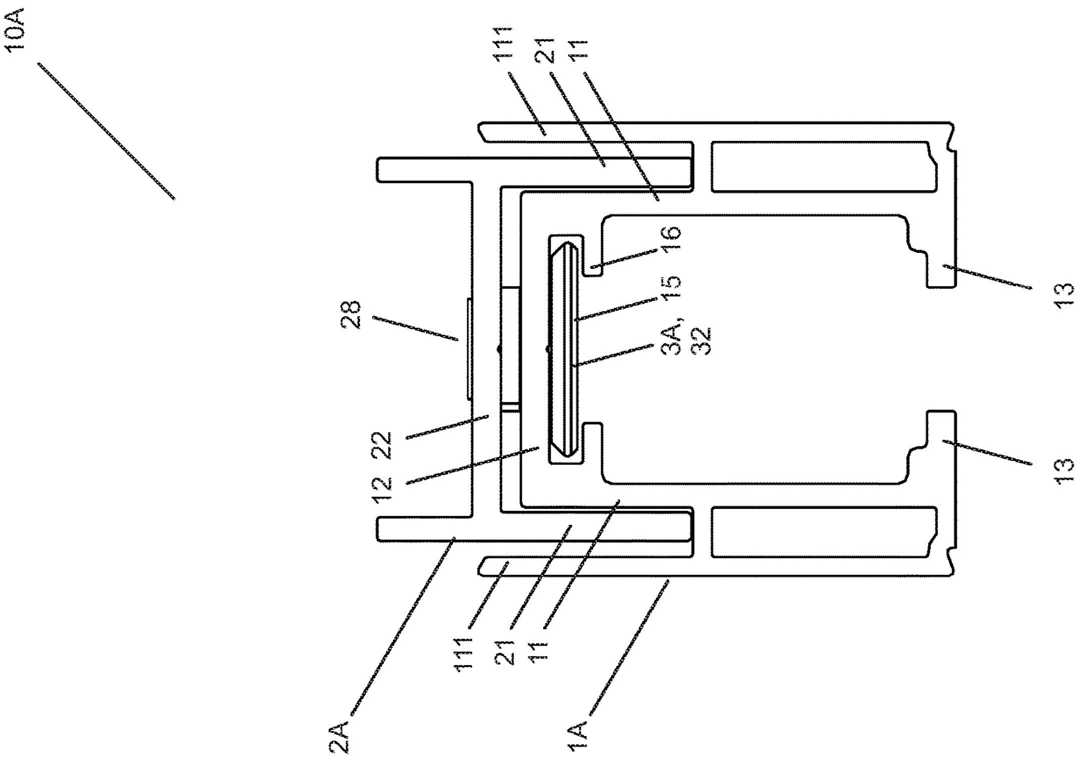
FIG. 2*b* the rail device 10A of FIG. 1*c* after connecting the guide rail 1A to the mounting rail 2A.

FIG. 2*b* shows the rail device 10A of FIG. 1*c* after connecting the guide rail 1A to the mounting rail 2A. The coupling plate 32 of the coupling head 3A has been inserted into the coupling channel 15 and the central member 12 of the guide rail 1A is held between the side members 21 of the mounting rail 2A. Hence, the guide rail 1A is movable only in parallel to the guide axis x or in parallel to the longitudinal axis of the rail device 10A. This facilitates the process of coupling and decoupling the guide rail 1A from the coupling heads 3A of the mounting rail 2A.

Figure 4:
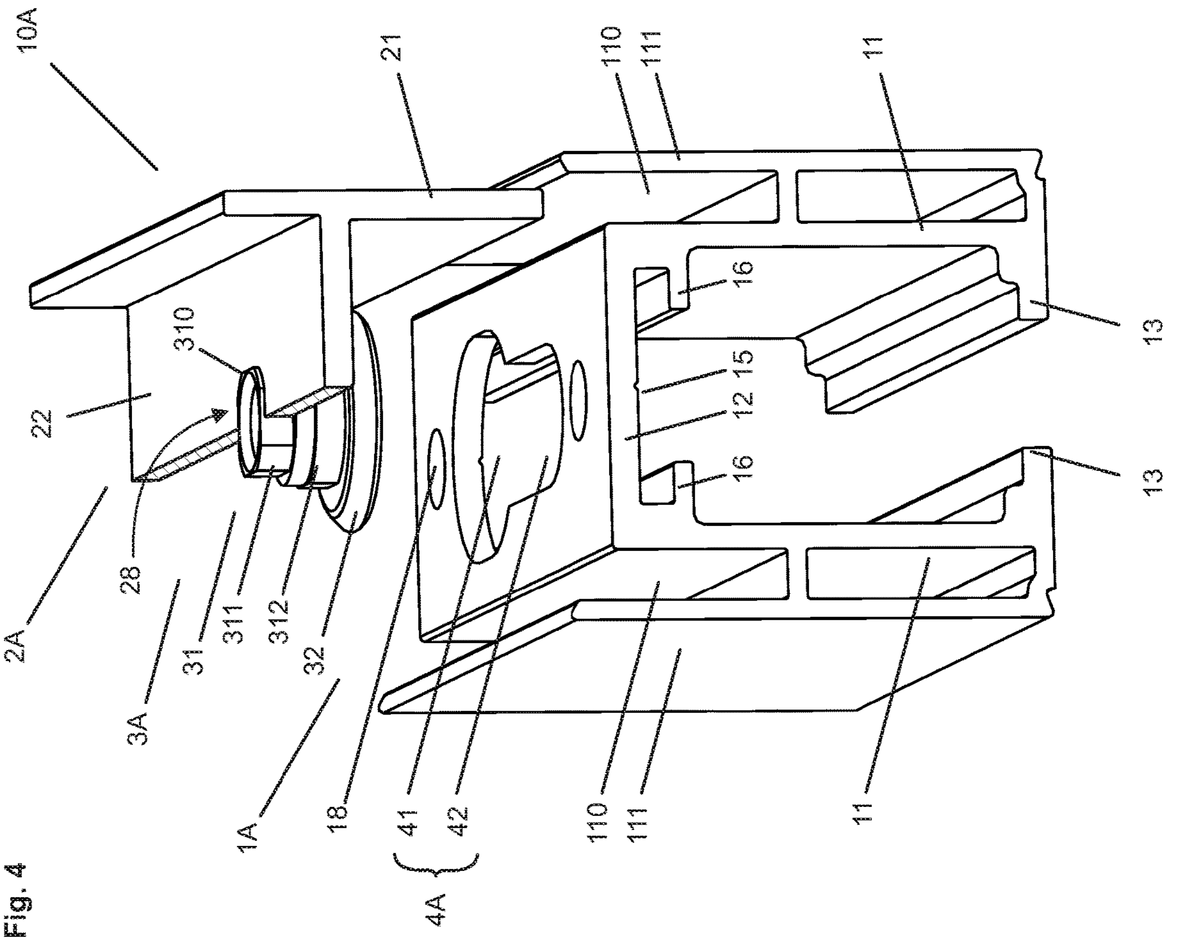
FIG. 4 the rail device 10A of FIG. 1*c* in spatial view with a cut along the longitudinal axis of the mounting rail 2A.
Figure 3A:
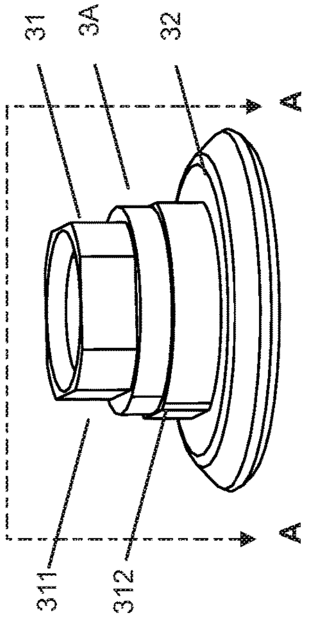
FIG. 3*a* one of the coupling heads 3A of FIG. 1*c* shown from above.
Figure 3B:
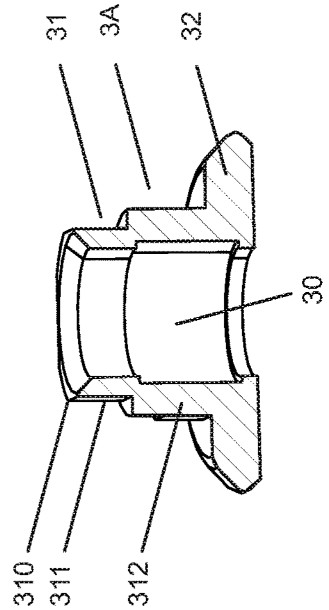
FIG. 3*b* the coupling head 3A of FIG. 3*a* in sectional view cut along line A-A.
Figure 3C:
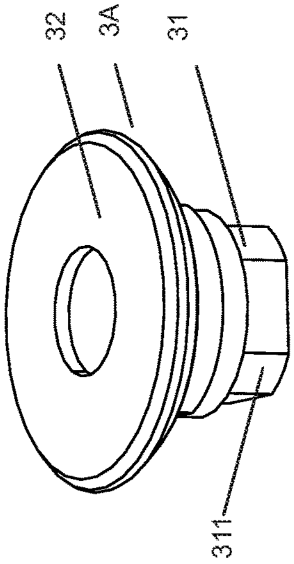
FIG. 3*c* the coupling head 3A of FIG. 3*a* shown from below.

FIG. 3*a* shows one of the coupling heads 3A of FIG. 1*c*. FIG. 3*b* shows the coupling head 3A of FIG. 3*a* cut along line A-A. FIG. 3*c* shows the coupling head 3A of FIG. 3*a* from below. FIG. 4 shows a part of the rail device 10A of FIG. 1*c* in spatial view with a cart along the longitudinal axis of the mounting rail 2A.

The coupling head 3A comprises a coupling neck 31, which comprises a connecting member 311 and a spacer portion 312. The connecting member 311, which has a small diameter than the spacer portion 312, is formed as an octagon and fits into a corresponding octagonal opening 28 provided in the central member 22 of the mounting rail 2A. After insertion into the octagonal opening 28 the upper side of the spacer portion 312 forms a flange ring which adjoins the lower side of the central member 22. The upper end piece 310 of the connecting member 311 projects then out of the octagonal opening 28 (see FIG. 9) and can be caulked, i.e. plastically deformed, so that the connecting member 311 is held, below by the spacer portion 312 and above by the press fitted end piece 310, axially immovable in the octagonal opening 28. By the octagonal form of the connecting member 311 and the opening 28 the connecting member 311 and therefore the complete coupling head 3A is also held torque proof.

The coupling neck 31 is adjoined by a round coupling plate 32, which is designed for entering the coupling channel 15 (see FIG. 4). FIG. 3*b* shows, that an axial bore traverses the whole coupling head 3A, which can be manufactured with an inner thread.

FIG. 4 shows the coupling opening 4A that is provided in the central member 12 of the guide rail 1A and that comprises a larger first opening part 41 and a smaller second opening part 42. The size of the larger opening part 41 is adapted to the coupling plate 32, which can be transferred at this position through the coupling opening 4A into the coupling channel 15. Subsequently the guide rail 1A can be shifted relative to the mounting rail 2A and can be anchored therein. Thereby second opening part 42 receives the spacer portion 312 preferably without play. However, the coupling plate 32 is held below the second opening part 42, whose bordering edges form a holding flange. Hence, the guide rail 1A is connected to the mounting rail 2A and can only be released by shifting the first opening part 41 back over the coupling plate 32. Into a further opening 18 in the guide rail 1A a bolt or a fixing screw 91 can be inserted, in order to lock the anchored guide rail 1A relative to the mounting rail 2A.

In order to hold the anchored guide rail 1A without play at coupling head 3A, preferably one or more resilient elements, preferably spring elements, such as leaf springs, are provided.

According to the invention, in order to facilitate removal of the coupling head 3A out of the coupling opening 4A, at least one ramp is provided, which adjoins the coupling head 3A.

The at least one resilient element and/or the at least one ramp can be connected in one piece to the coupling head 3A or can be moulded thereto in one piece. Preferably a buffer device is provided, which comprises the at least one resilient element and/or the at least one ramp.

Figure 5A:
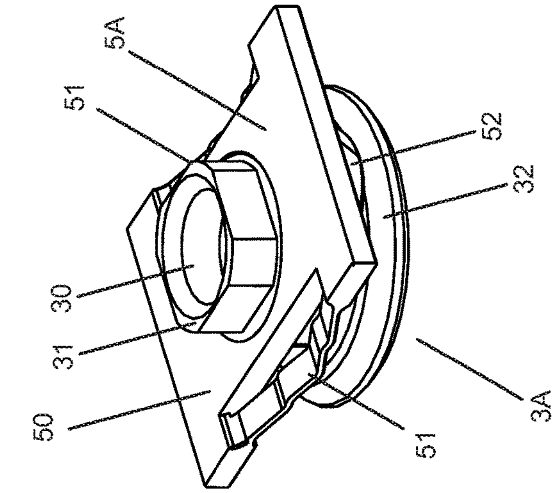
FIG. 5*a* shown from above, the coupling head 3A of FIG. 3*a* with a buffer device 5A connected thereto, which comprises spring elements 51 on both sides and a ramp 52 each on the front side and on the backside.
Figure 5B:
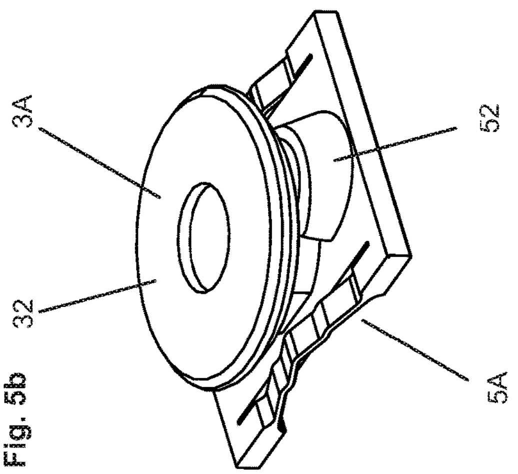
FIG. 5*b* shown from below, the coupling head 3A with the buffer device 5A of FIG. 5*a* connected thereto.

FIG. 5*a* shows the coupling head 3A of FIG. 3*a* with a buffer device 5A connected thereto, which comprises spring elements on both sides and a ramp 52 on the front side and the backside each. FIG. 5*b* shows the coupling head 3A of FIG. 5*a* with the buffer device 5A connected thereto from below.

Figure 6A:
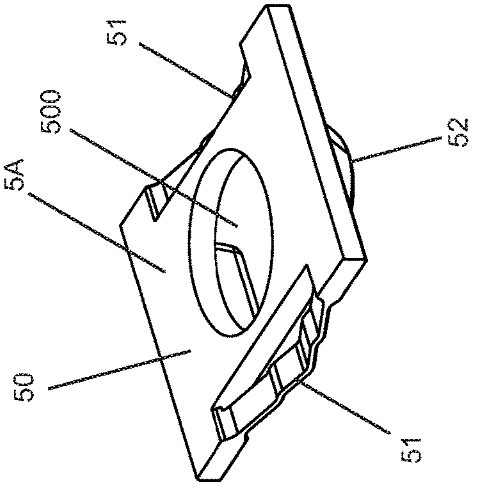
FIG. 6*a* shown from above, the buffer device 5A of FIG. 5*a;*
Figure 6B:
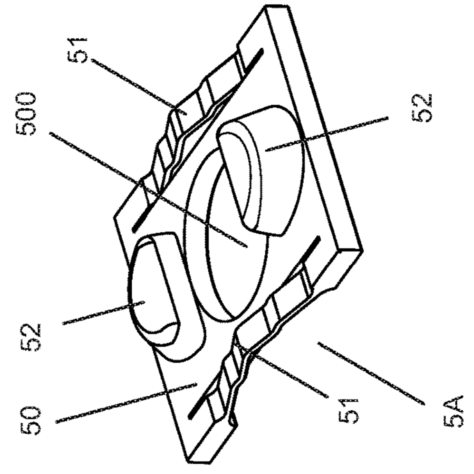
FIG. 6*b* shown from below, the buffer device 5A of FIG. 5*a;*

FIG. 6*a* shows the buffer device 5A of FIG. 5*a* from above and FIG. 6*b* shows the buffer device 5A of FIG. 6*a* from below.

The buffer device 5A consists of a rectangular buffer plate 50, which comprises an opening 500 in the centre, which serves for receiving the coupling neck 31 of the coupling head 3A, as shown in FIG. 5*a*. On opposite sides the buffer plate 50 comprises resilient elements that are directed downwards or spring elements, respectively, in the form of leaf springs that are held on both sides. The spring elements 51 are formed from the buffer plate 50 and are aligned in parallel to one another. Alternatively, the spring elements 51 can also be held on one side only. At the lower side, the buffer plate 50 is provided at the front side and the backside each with a ramp 52, which both, seen from below, increasing height in direction towards the opening 500.

FIG. 5*a* shows that the spring elements 51 and the ramps 52 of the coupling plate 32 are directed towards the coupling head 3A, so that they can interact with the central member 12 of the guide rail 1A held by the coupling head 3A or with the bordering edge surrounding the coupling opening 4A of the central member 12.

Figure 7:
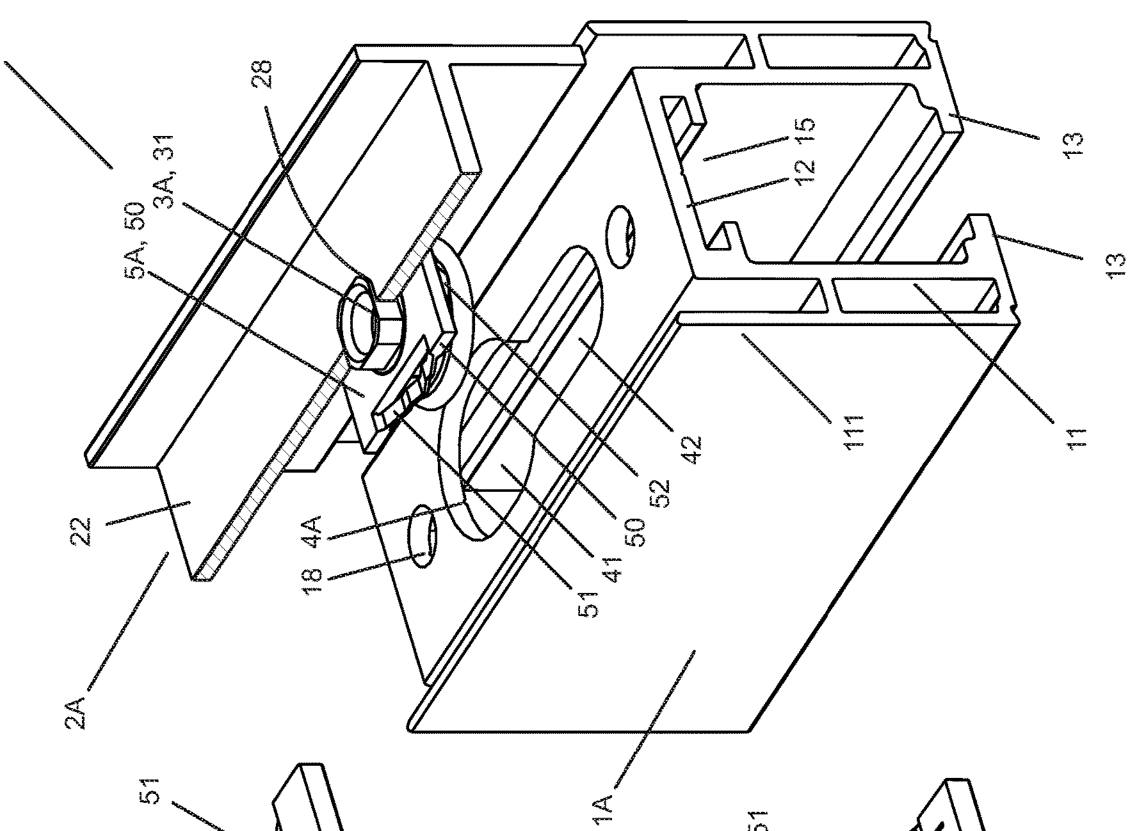
FIG. 7 the rail device 10A of FIG. 4 with the buffer device 5A of FIG. 5*a* set up on the coupling head 3A and the mounting rail 2A, along its longitudinal axis.

FIG. 7 shows the rail device 10A of FIG. 4 with the buffer device 5A of FIG. 5*a* set up on the coupling head 3A. The buffer plate 50 adjoins the central member 22 of the mounting rail 2A and the spring elements 51 and the ramps 52 provided at the buffer plate 50 extend towards the central member 12 of the guide rail 1A. In order to show the installed coupling head 3A with the buffer device 5A the mounting rail 2A is cut along its longitudinal axis.

Figure 8B:
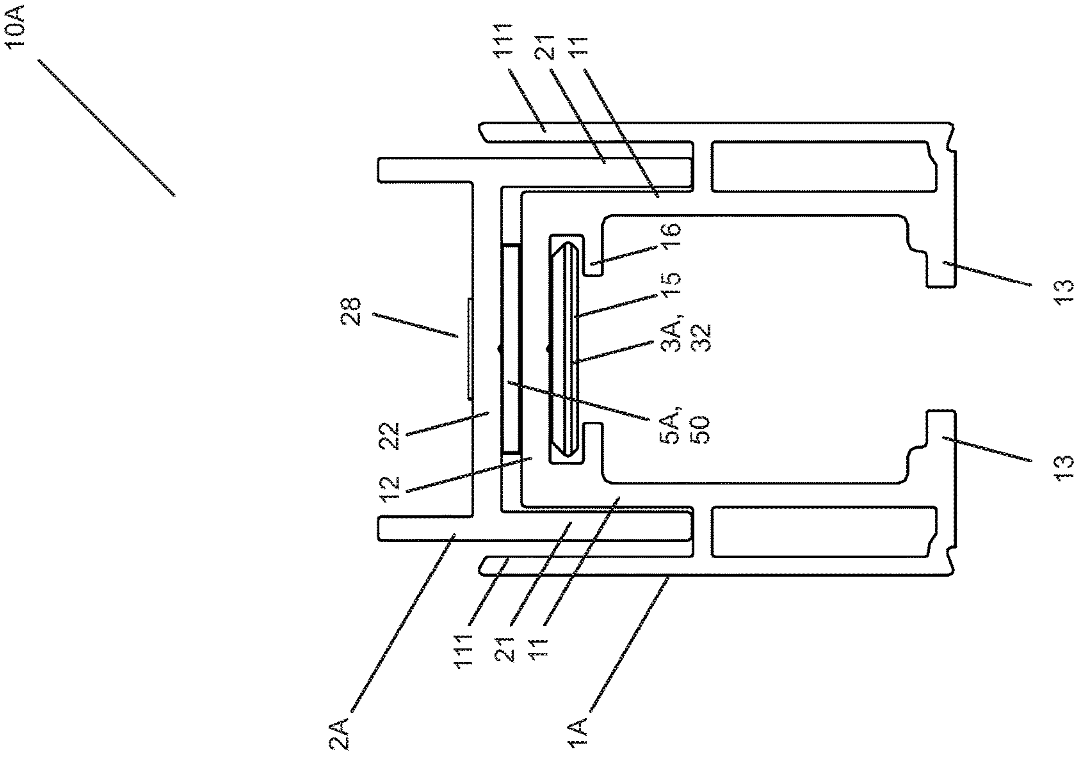
FIG. 8*b* the rail device 10A of FIG. 8*a* after connecting the guide rail 1A to the mounting rail 2A.
Figure 8A:
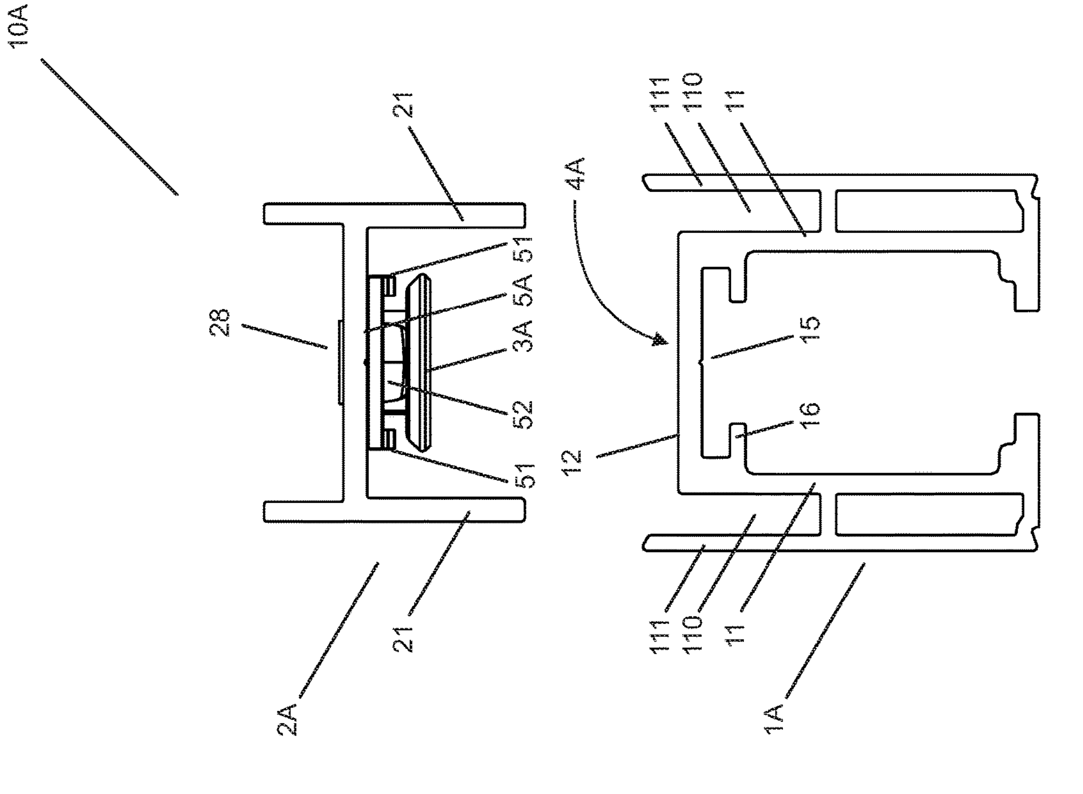
FIG. 8*a* in a front view, the rail device 10A of FIG. 7 with the guide rail 1A separated from the mounting rail 2A.

FIG. 8*a* shows the rail device 10A of FIG. 7 with the guide rail 1A separated from the mounting rail 2A. FIG. 8*b* shows the rail device 10A of FIG. 8*a* after the guide rail 1A has been coupled to the mounting rail 2A. The buffer plate 50 is held above the central member 12 of the guide rail 1A and presses the guide rail 1A with the nonvisible spring elements 51 without play against the coupling plate 32 of the coupling head 3A, which is held by means of the coupling strips 16 within the coupling channel 15.

Figure 9A:
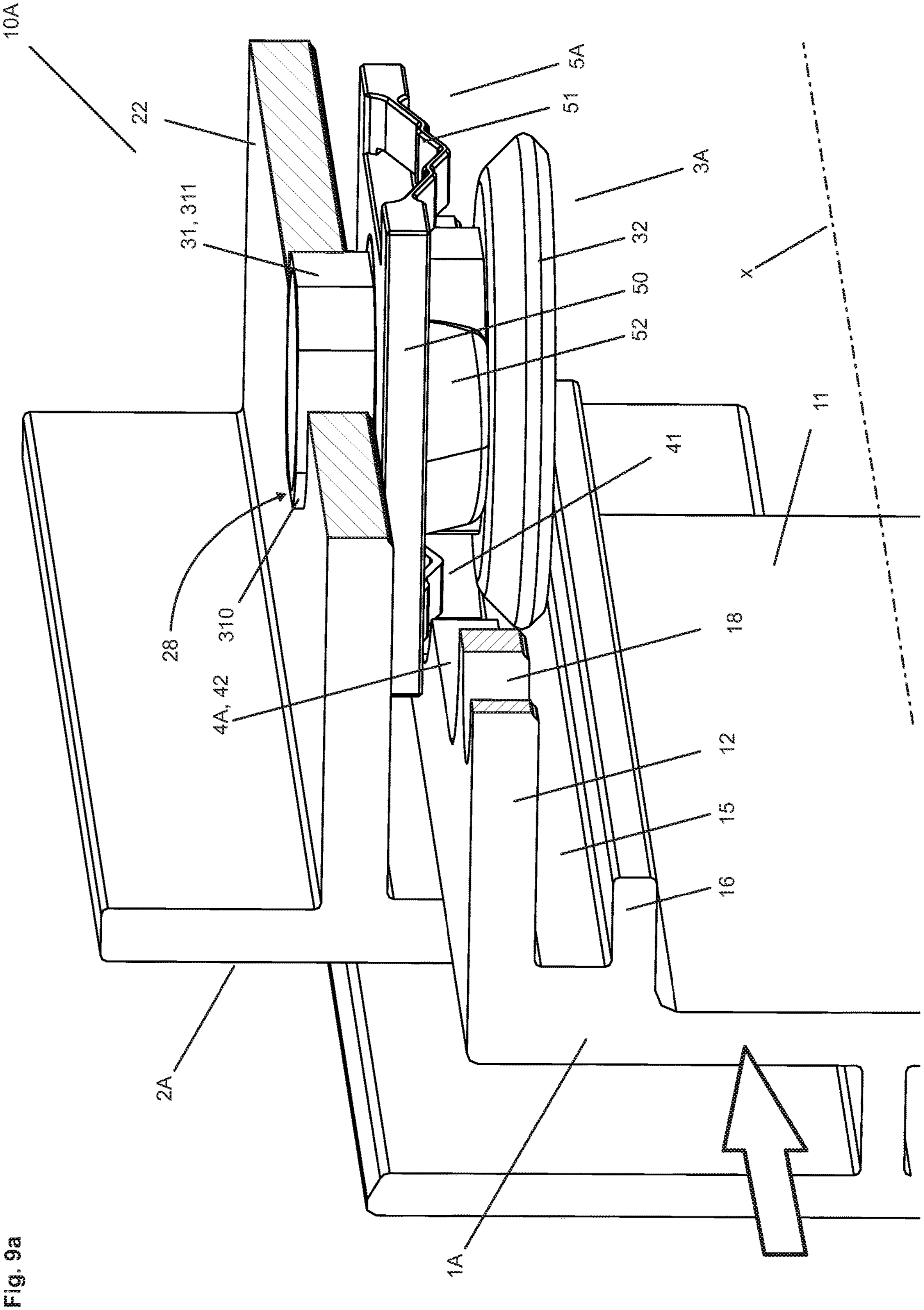
FIG. 9*a* a part of the rail device 10A of FIG. 8*b* with a cut along the longitudinal axes of the guide rail 1A and the mounting rail 2A.

FIG. 9*a* shows in spatial new a part of the rail device 10A of FIG. 8*b* with a cut along the longitudinal axes of the guide rail 1A and the mounting rail 2A. It can be seen that the, polygonal or preferably octagonal connecting member 311 of the coupling neck 31 is held torque proof in the polygonal or preferably octagonal opening 28 within the central member 22 of the mounting rail 2A drehfest. The upper end piece 310 of the connecting member 311 of the coupling neck 31 projects beyond the central member 22 of the mounting rail 2A and can be deformed by caulking into a flange element. The buffer plate 50 of the buffer device 5A adjoins the lower side of the central member 22 of the mounting rail 2A and presses with the spring elements 51 against the upper side of the central member 12 of the guide rail 1A. The coupling plate 32 of the coupling head 3A has been transferred through the coupling opening 4A into the coupling channel 15 and lies above the coupling strips 16. The ramps 52 are aligned in parallel to the rail axis and prevent the coupling plate 32 from being driven on the front side or the backside below the edge of the central member 12 of the guide rail 1A. The coupling plate 32 lies still below the first opening part 41 and will be placed below the second opening part 42 of the coupling opening 4A and anchored there by shifting the guide rail 1A in the direction indicated by an arrow. Through the opening 18 in the guide rail 1A a lock element can be guided against the mounting rail 2A.

Figure 9B:
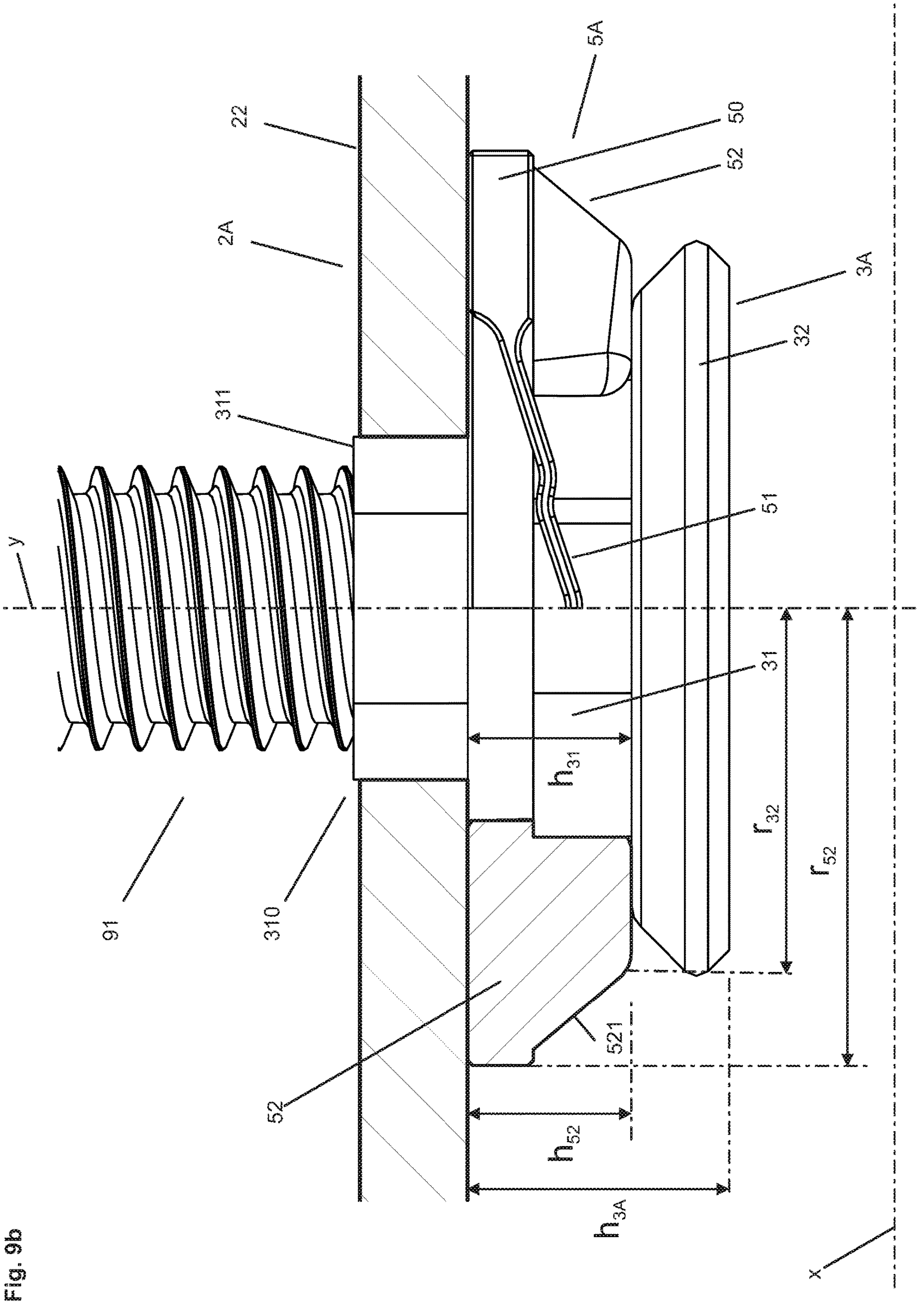
FIG. 9*b* the part of the rail device 10A of FIG. 9*a* with a cut along the longitudinal axis of the mounting rail 2A and a cut through the proximal left corner of the buffer device 5A of FIG. 5*a;*

FIG. 9*b* shows the part of the rail device 10A of FIG. 9*a* with a cut along the longitudinal axis of the mounting rail 2A and a cut through the proximal left corner of the buffer device 5A of FIG. 5*a*. Hence, the left ramp 52 is shown in sectional view and the left side of spring element 51 has been cut away. It is shown that the ramp 52 adjoins the lower side of the coupling plate 32 of the coupling head 3A, i.e. the side facing the coupling neck 31. In this preferred embodiment, the height h52 of the ramp 52 therefore corresponds approximately to the height h31 of the coupling neck 31, and is therefore smaller than the height h3A of the coupling head 3A.

The ramp 52 has a front face 521 that is inclined relative to the guide axis x with an angle preferably in the range between 40° and 60° most preferably with an angle of approximately 45°.

The front face 521 is preferably located outside the radius r32 of coupling plate 32 and preferably ends at least approximately at the periphery of the coupling plate 32. Hence, the front face 521 extends from the endpoint of radius r32 of coupling plate 32 to the endpoint of radius r52 of the buffer device 5A each measured from a central axis y of the coupling head 3A in a direction in parallel to the guide axis x.

Figure 10B:
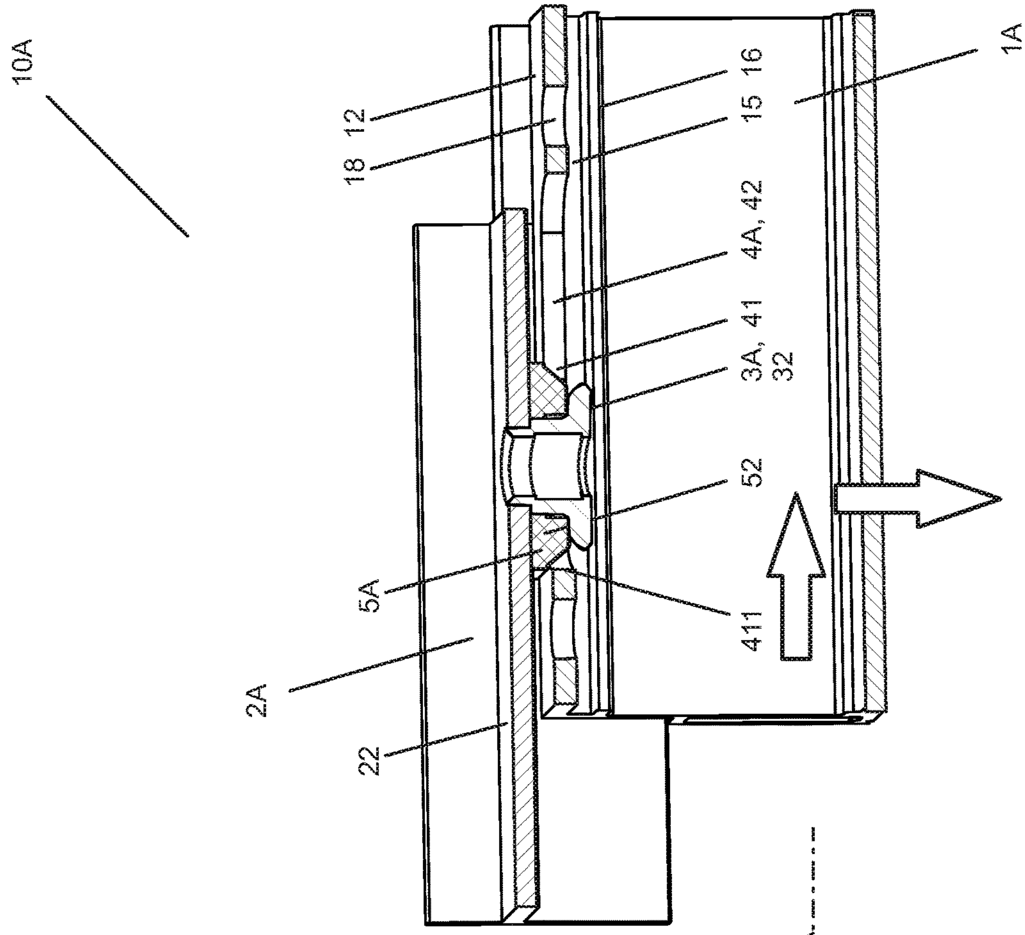
FIG. 10*b* the rail device 10A of FIG. 10*a* with the coupling head 3A displaced into a first opening part 41 of the coupling opening 4A.
Figure 10A:
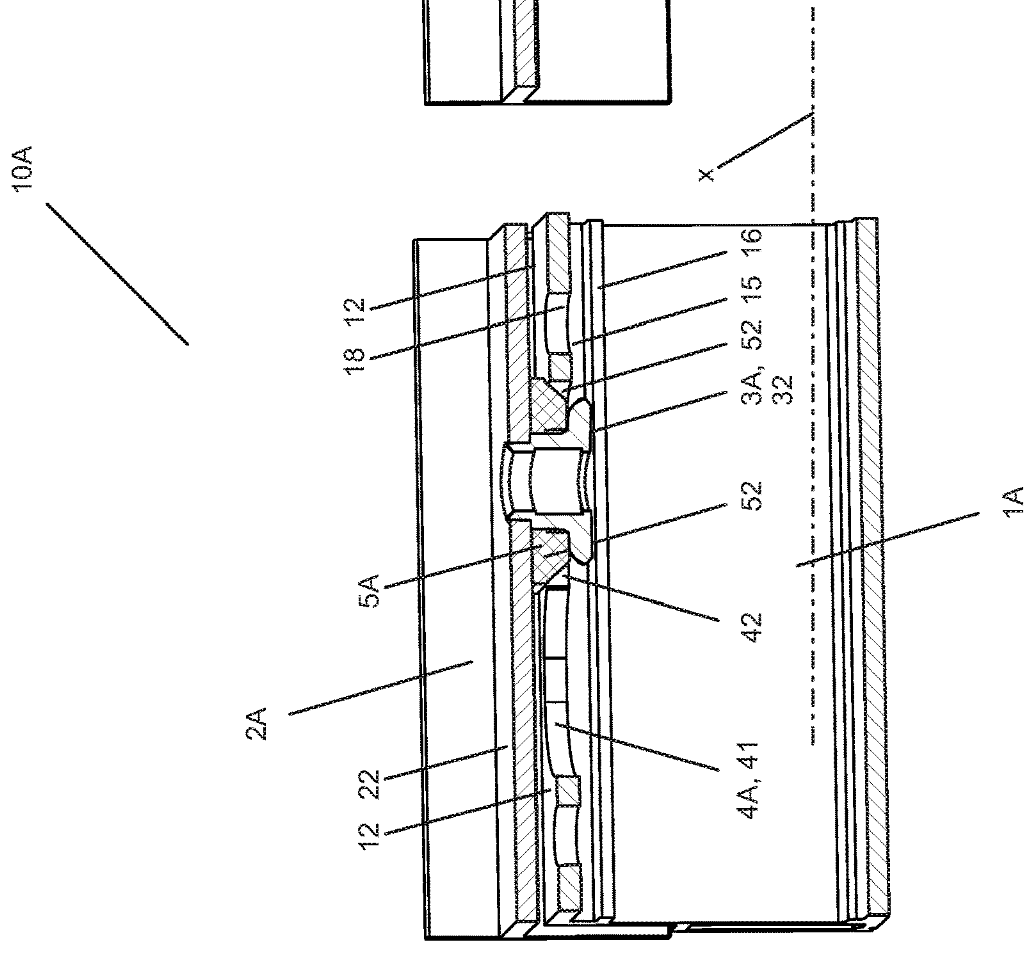
FIG. 10*a* the rail device 10A of FIG. 9 with the coupling head 3A anchored in a second opening part 42 of the coupling opening 4A.

FIG. 10*a* shows the rail device 10A of FIG. 9 with the coupling head 3A anchored in the second opening part 42 of the coupling opening 4A. The front sided ramp 52 of the buffer device 5 abuts the edge of the coupling opening 4A and prevents the coupling plate 32 to move along the guide axis X below the central member 12 of the guide rail 1A.

FIG. 10*b* shows the rail device 10A of FIG. 10*a* with the coupling head 3A shifted into the first opening part 41 of the coupling opening 4A. In this position the back sided ramp 52 abuts the edge of the coupling opening 4A and prevents the coupling plate 32 to move along the guide axis X below the central member 12 of the guide rail 1A. When moving the guide rail 1A the coupling head 3A is released from anchorage in the second opening part 42 of the coupling opening 4A and 58 into the first opening part 41, whereafter the guide rail 1A can be removed, without the risk that the coupling plate 32 could engage in the central member 12 of the guide rail 1A.

Figure 11:
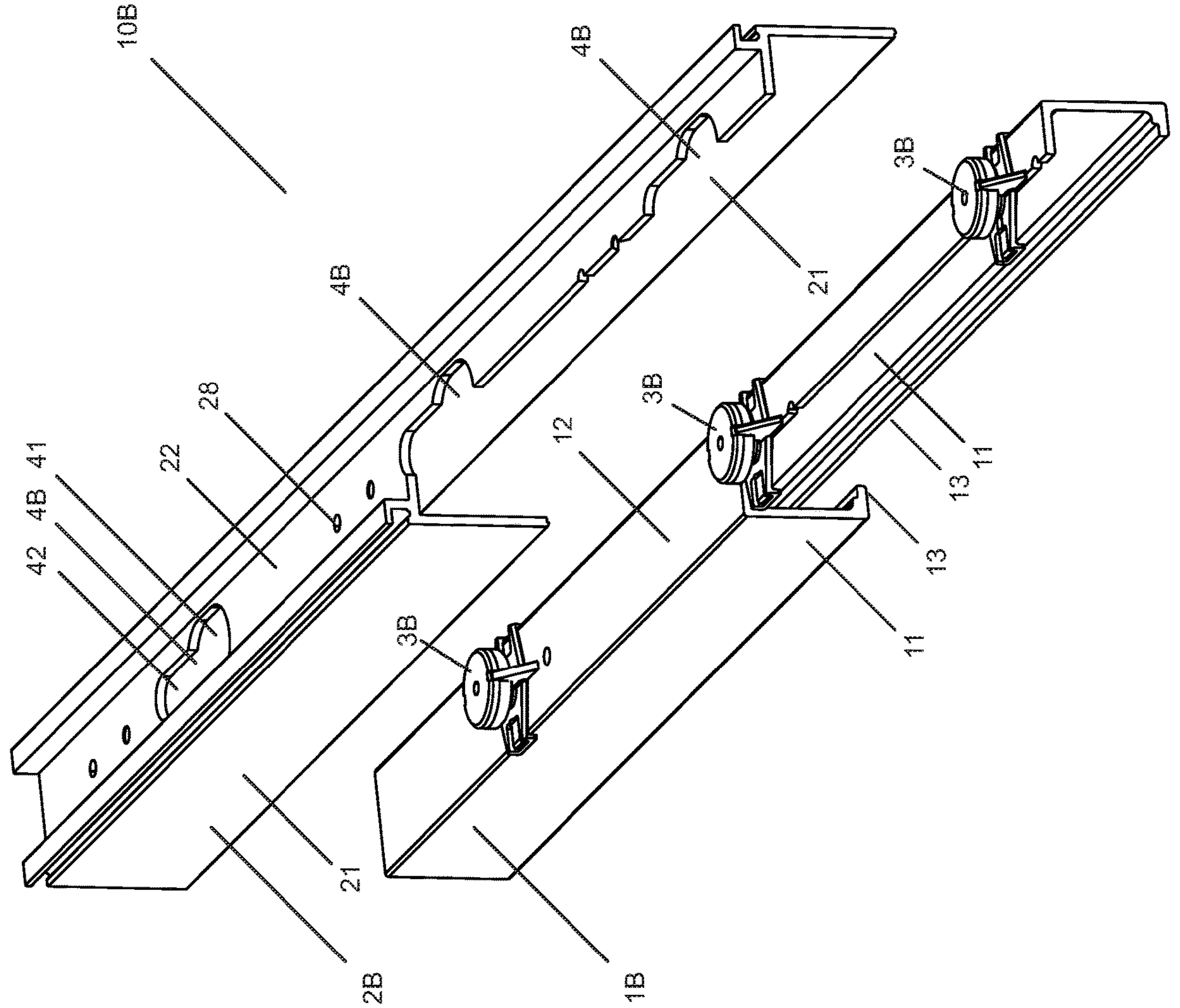
FIG. 11 an inventive rail device 10B, of which a proximal quarter has been cut away, in a further preferred embodiment with coupling devices, which comprise coupling heads 3B that are connected to the guide rail 1B and that can be anchored in coupling openings 4B provided in the mounting rail 2B.

FIG. 11 shows an inventive rail device 10B in a second preferred embodiment. The proximal quarter of the rail device 10B has been cut away to show the elements of the coupling devices, which comprise coupling heads 3B that are connected to the guide rail 1B and stand will be anchored in coupling openings 4B provided in the mounting rail 2B.

The guide rail 1B is shown in a simpler embodiment and comprises a central member 12 adjoined by side members 11 on both sides, which form together with a foot member 13 each an L-profile. On the central member 12 the coupling heads 3B are arranged and held torque proof.

The mounting rail 2B comprises a U-profile that is opened downwards and that comprises a central member 22 with the coupling openings 4B. On both sides of the central member 22 side members 21 are provided, whose mutual distances larger than the mutual distance of the side members 11 of the guide rail 1B. Hence, the guide rail 1B can be received in the U-profile of the mounting rail 2B, whereby the coupling of the guide rail 1B to the mounting rail 2B is facilitated.

The coupling openings 4B provided in the central member 22 of the mounting rail 2B correspond to the coupling openings 4A in the guide rail 1A as shown e.g. in FIG. 4 and comprise also a larger first opening part 41 and a smaller second opening part 42 which form approximately a keyhole. The first opening part 41 is for example circular and the second opening part 42 is elongated or at least approximately rectangular and preferably rounded. The coupling of the guide rail 1B to the mounting rail 2B is done in the same way as described above, merely the coupling devices are mounted invers in the rail device 10B, wherefore a kinematic inversion is present.

Figure 12C:
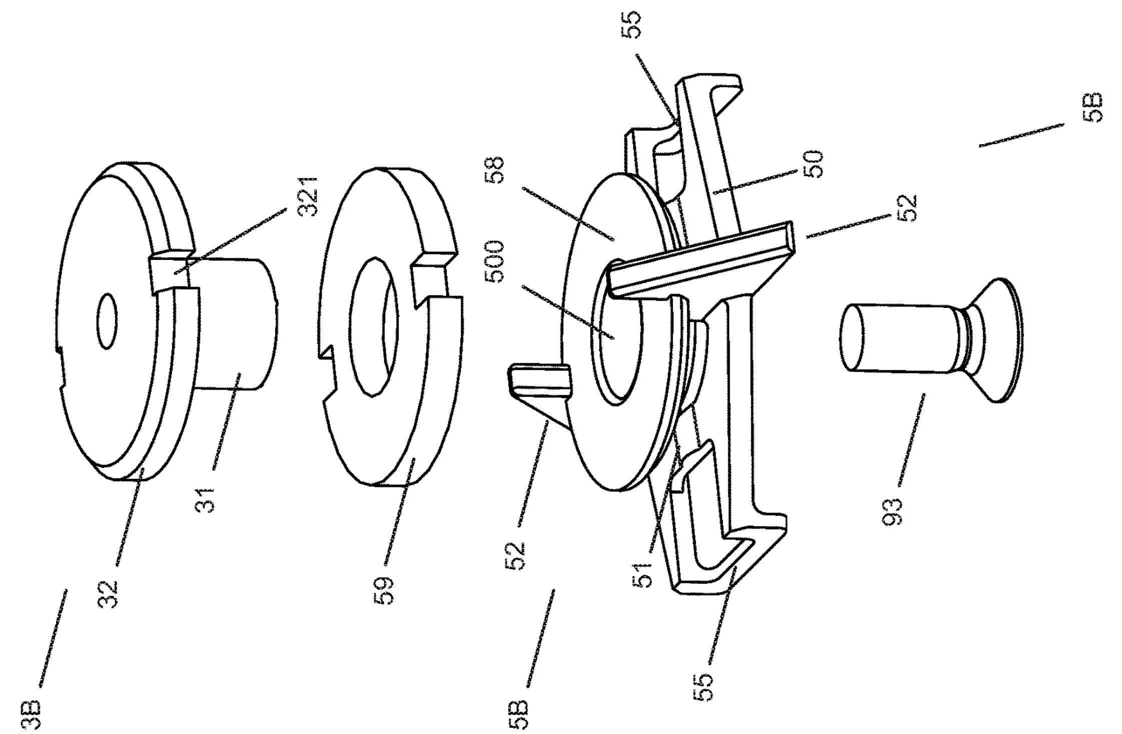
FIG. 12*c* the coupling head 3B and the buffer device 5B of FIG. 12*a* in explosion view.
Figure 12A:
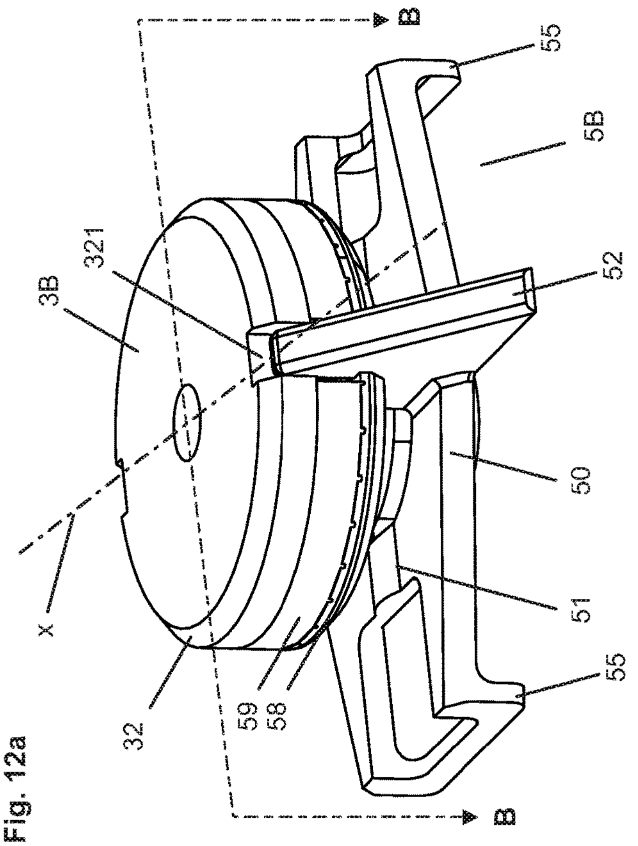
FIG. 12*a* one of the coupling heads 3B of FIG. 11 as well as a buffer device 5B connected thereto shown in a further preferred embodiment.
Figure 12B:
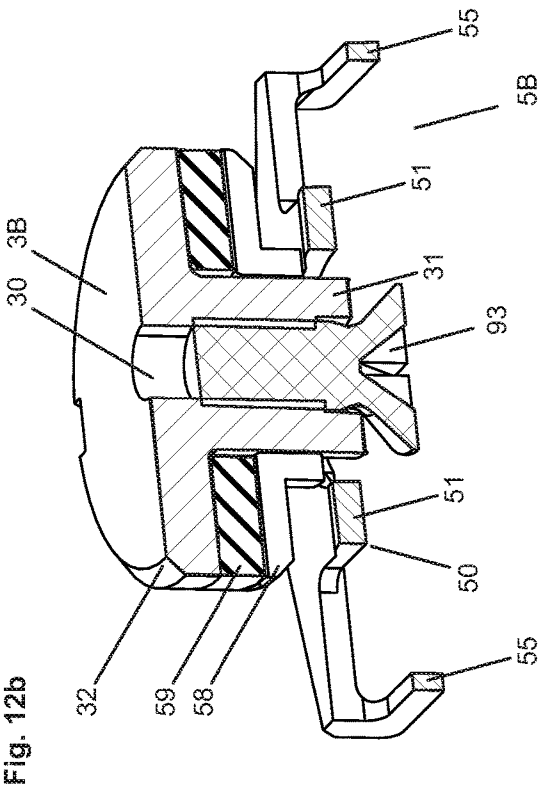
FIG. 12*b* the coupling head 3B and the buffer device 5B cut along line B-B of FIG. 12*a;*

FIG. 12*a* shows one of the coupling heads 3B of FIG. 11 and a buffer device 5B connected thereto, which also is provided at the front side and the backside each with a ramp 52 and on both sides with spring elements 51. FIG. 12*b* shows the coupling head 3B and the buffer device 5B cut along line B-B shown in FIG. 12*a*. FIG. 12*c* shows the coupling head 3B and the buffer device 5B of FIG. 12*a* in explosion view.

As shown in the preferred embodiment of FIG. 10*b*, the ramps 52 connected to the buffer device 5B prevent the coupling plate of the coupling head 3B from engagement in the central member 22 of the mounting rail 2B when dismounting and moving the guide rail 1B along the guide axis X.

In addition, the ramp 52 serves for holding the coupling head 3B torque proof. For this purpose, the buffer device 5B comprises holding elements 55 on both sides, which embrace the central member 12 of the guide rail 1B on both sides and therefore hold the buffer device 5B and the ramps 52 torque proof. The ramps 52 each extend into a holding groove 321 provided in the coupling plate 32 of the coupling head 3B, whereby the coupling head 3B is firmly coupled to the guide rail 1B and held torque proof.

FIG. 12*a* and FIG. 12*b* show, that the spring elements 51 are an integral part of the buffer plate 50 and are slightly curved towards the coupling plate 32.

FIG. 12*b* shows, that between the coupling plate 32 of the coupling head 3B and a support plate 58 of the buffer device 5B optionally an elastic damping element 59 is provided, which has an annular shape and consists of elastic plastic material. The support plate 58, the damping element 59 and the coupling plate 32 form a unity and are transferred as a unity through a related coupling opening 4B in the central member 22 of the mounting rail 2B and are anchored as shown in FIG. 13.

The coupling neck 31, which has been guided through an opening 500 in the damping element 59 and in the support plate 58, comprises an inner thread, in which a mounting screw 93 is turned. By means of the mounting screw 93 the coupling head 3B and the buffer device 5B are screwed to the central member 12 of the guide rail 1B.

Figure 13B:
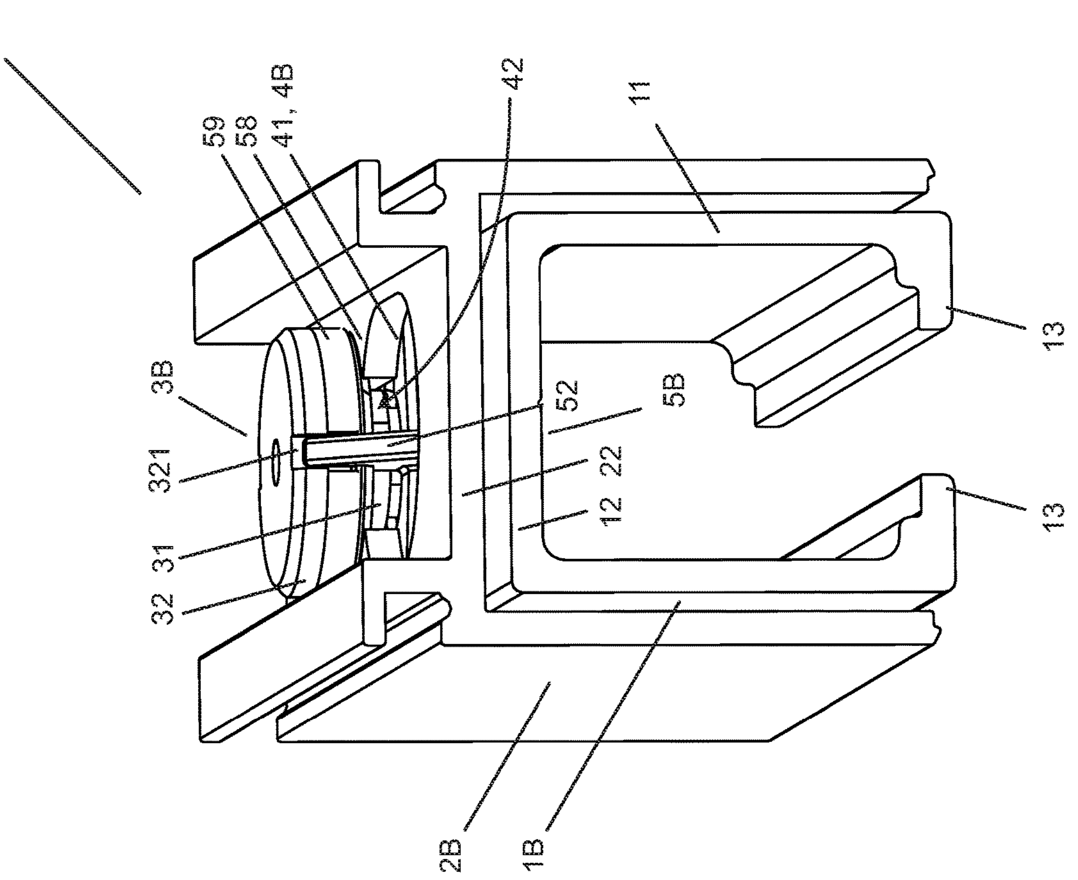
FIG. 13*b* the rail device 10A of FIG. 13 after coupling the guide rail 1B to the mounting rail 2B.
Figure 13A:
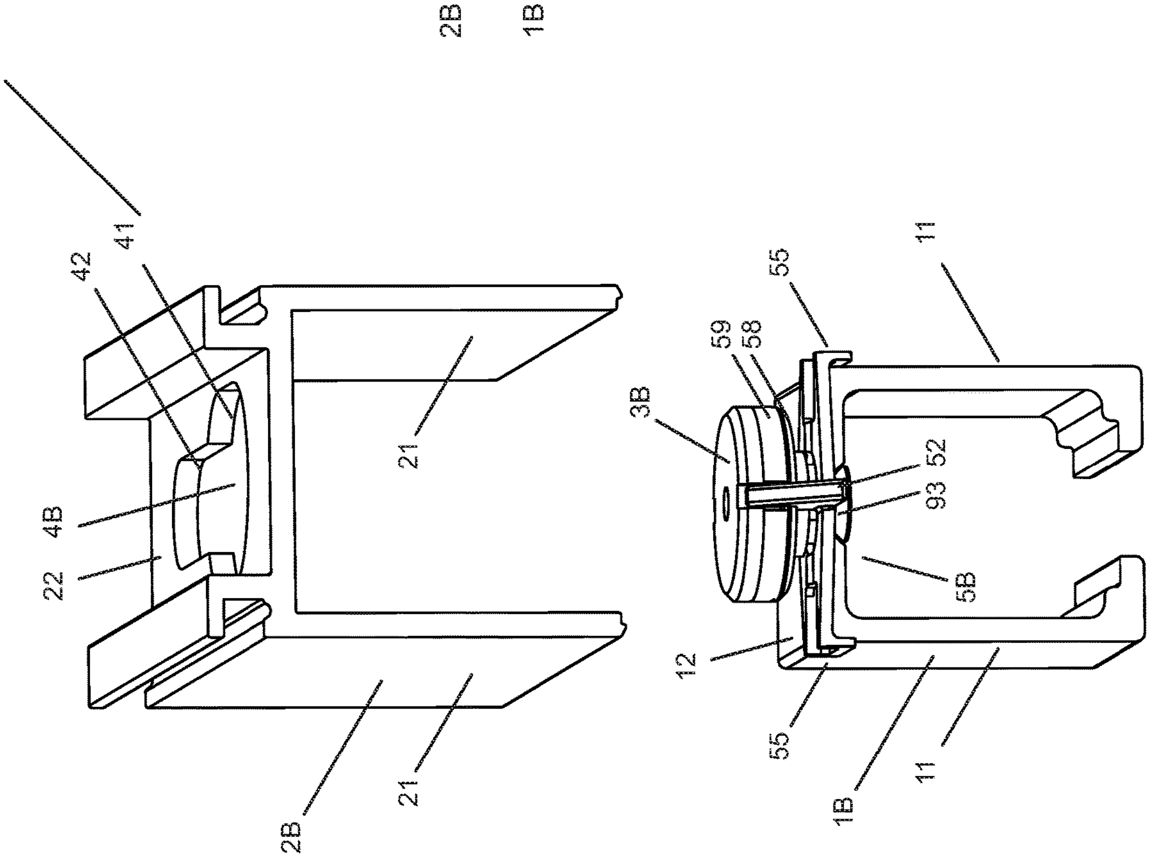
FIG. 13*a* the rail device 10B of FIG. 11 with the guide rail 1B separated from the mounting rail 2B.

FIG. 13*a* shows the rail device 10B of FIG. 11 with the guide rail 1B separated from the mounting rail 2B. The guide rail 1B is connected to the coupling head 3B and the buffer device 5B by the mounting screw 93.

FIG. 13*b* shows the rail device 10A of FIG. 13*a* after the guide rail 1B to the mounting rail 2B. The guide rail 1B has been lifted and, after the transfer of the coupling head 3B through the first opening part 41 of the coupling opening 4B, has been shifted in parallel to the guide axis x, whereby the coupling neck 31 of the coupling head 3B has been transferred into the second opening part 42 of the coupling opening 4B and anchored.

In this position the resilient elements 51 (not visible) abut the lower side of the central member 22 of the mounting rail 2B and at the upper side of the mounting rail 2B, above the second opening parts 42, the coupling unit is held, which consists of the support plate 58, the damping element 59 and the coupling plate 32. Hence, coupling plate 32, which is screwed to the central member 12 of the guide rail 1B, is separated by the resilient element 59 from the support plate 58, which adjoins the central member 22 of the mounting rail 2B. Hence, the mounting rail 2B is elastically held from above by the damping element 59 and from below by the spring elements 51 and is therefore decoupled from the guide rail 1B. Hence, noise that is caused by the carriages 63 when moving the sliding door 6 will not be transferred from the guide rail 1B to the mounting rail 2B and the building.

Figure 14:
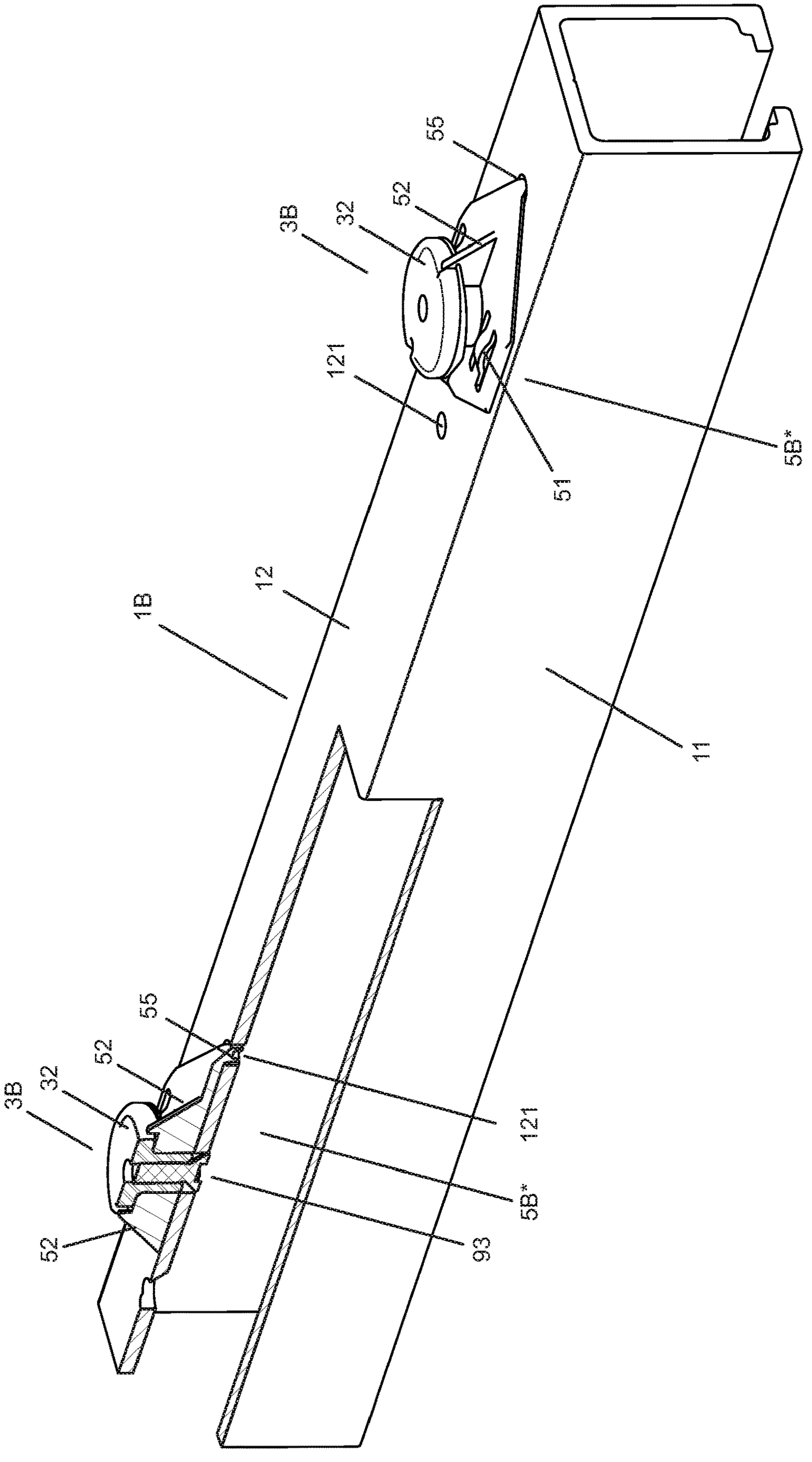
FIG. 14 the guide rail 1B of FIG. 11 with two installed coupling devices 3B, which are provided with modified buffer devices 5B*.

FIG. 14 shows the guide rail 1B of FIG. 11 with two installed coupling devices 3B that are provided each with a modified buffer device 5B*. A cut has been made along the symmetry axis through the rear part of the guide rail 1B and through the rear coupling device 3B. The buffer device 5B* again comprises a buffer spring 51 and a buffer ramp 52, which serve for the purposes described above. However, only one holding element 55 is provided, which in the form of a spine is held in an opening 121 provided indie central member 12 of the guide rail 1B. Holding elements, which laterally extend the guide rail 1B, can be avoided.

LIST OF REFERENCES

1A, 1B guide rail
10A rail device in the first embodiment
10B rail device in the second embodiment
11 side members of the guide rail
110 coupling space
111 coupling flange
12 central member of the guide rail
121 receiving opening in the central member 12
13 foot members of the guide rail
15 coupling channel
16 coupling strip
18 bore in the guide rail
2A first embodiment of the mounting rail
2B second embodiment of the mounting rail
21 side members of the mounting rail 2A
22 central member of the mounting rail 2A
28 bore in the mounting rail 2A
3A coupling head mounted at the guide rail 1A
3B coupling head mounted at the mounting rail 2A
30 threaded channel, transfer channel
31 coupling neck
310 mounting collar
311 connecting member
312 spacer portion
32 coupling plate
321 holding groove
4A coupling opening in the guide rail 1A
4B coupling opening in the mounting rail 2B
41 first opening part
411 from sided edge of the first opening part 41
42 second opening part
5A buffer device mounted at the mounting rail 2A
5B buffer device mounted at the guide rail 1B
5B* buffer device (alternative embodiment)
50 buffer plate
500 buffer opening
51 buffer spring, resilient element
52 buffer ramp, ramp
55 holding element
58 support plate
59 damping element
6 sliding door
61 door fitting
611 fitting rail
612 fitting block
62 threaded bar
63 carriage
631 carriage wheels
7 parking space
70 room opening
71 first room wall
72 second room wall
91 mounting screw
93 connecting screw

The invention claimed is:

1. Sliding door system with a rail device, the rail device comprising:

a mounting rail mountable in a building, a guide rail in which at least two carriages that are connected to a sliding door are held displaceable along a guide axis (x), and a plurality of coupling devices, the guide rail and the mounting rail are releasably connected to the plurality of coupling devices, the plurality of coupling devices each including:

a coupling head that is connected to the guide rail or to the mounting rail, a coupling plate; and a coupling neck that is anchored to a coupling opening, the coupling opening being provided in the mounting rail or the guide rail and including:

a first opening part with a first diameter that is larger than a diameter of the coupling plate, and a second opening part adjacent to the first opening part with a diameter larger than a diameter of the coupling neck but smaller than the diameter of the coupling plate, wherein at least on one side of the coupling head a ramp is provided, in a direction towards the coupling neck, and the ramp increases in height towards the coupling plate.

2. Sliding door system according to claim 1, wherein the guide rail and the mounting rail each comprise a central member, that is connected either to the coupling head or that is provided with the coupling opening, that the central member of the guide rail is provided on both sides each with a first side member, and that the central member of the mounting rail is provided on both sides each with a second side member.

3. Sliding door system according to claim 2, wherein at least one side of the coupling head includes a resilient element that elastically abuts the central member of the guide rail or the mounting fail coupled to the coupling head.

4. Sliding door system according to claim 2, wherein the coupling head comprises a transfer channel or that the coupling head is held torque proof in the central member.

5. Sliding door system according to claim 2, wherein the coupling opening adjoins a coupling channel, which is bordered by the central member of the guide rail as well as coupling strips distant therefrom, which arranged within the guide rail aligned in parallel to the central member and facing one another and which are connected each with one of the first side member or the second side member of the guide rail.

6. Sliding door system according to claim 1, wherein the ramp has a front face that is inclined relative to the guide axis x with an angle in the range between 40° and 60° or with an angle of approximately 45°.

7. Sliding door system according to claim 6, wherein the height (h52) of the ramp is smaller than the height (h3A) of the coupling head or that the height (h52) of the ramp corresponds to the height (h32) of the coupling neck and that the front face of the ramp is located outside of a radius (r32) of the coupling plate.

8. Sliding door system according to claim 1, wherein the coupling head is dimensioned such that the coupling plate is guidable through the first opening part of the coupling opening and the coupling neck is displaceable along the guide axis (x) within the second opening part.

9. Sliding door system according to claim 1, wherein the ramp is provided on the side of the coupling neck, which, after the guide rail has been connected to the mounting rail, is facing the first opening part or that on both sides of the coupling head each a ramp is provided, which, in a direction towards the coupling neck, increases in height towards the coupling plate.

10. Sliding door system according to claim 1, further comprising a buffer device connected to the coupling head and coupled in a form-looking manner or is provided, in one piece, with the ramp or with a resilient element.

11. Sliding door system according to claim 10, wherein:

the buffer device comprises a buffer plate with a buffer opening that embraces the coupling neck of the coupling head, and the ramp and the resilient element are provided at the buffer plate.

12. Sliding door system according to claim 11, wherein on opposite sides of the buffer plate each one of the resilient elements formed as a leaf spring that is held on one or both sides and that is aligned in parallel to the guide axis (x).

13. Sliding door system according to claim 10, wherein between the coupling plate of the coupling head and a support plate connected to the buffer device an elastic damping element is provided.

14. Sliding door system according to claim 10, wherein the buffer device comprises at least one holding element, which is connected in a form-looking manner to the guide rail or that the ramp of the buffer device engages in a form-looking manner in a recess provided in the coupling head.

15. Sliding door system according to claim 1, wherein a parking space is provided that is delimited by two room walls and into which the rail device is extending.

* * * * *